United States Patent
Heilskov et al.

(10) Patent No.: US 12,181,218 B2
(45) Date of Patent: *Dec. 31, 2024

(54) BRIDGE REDUCING MIXED-FLOW GRAIN DRYER WITH CROSS-FLOW VACUUM COOL HEAT RECOVERY SYSTEM

(71) Applicant: Sukup Manufacturing Co., Sheffield, IA (US)

(72) Inventors: Casey Scott Heilskov, Hampton, IA (US); Kerry Hartwig, Iowa Falls, IA (US); Tyler Rau, Stanley, IA (US); Vernon Martin, Osage, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,075

(22) Filed: Oct. 6, 2023

(65) Prior Publication Data
US 2024/0027131 A1    Jan. 25, 2024

Related U.S. Application Data

(63) Continuation of application No. 17/516,105, filed on Nov. 1, 2021, now Pat. No. 11,835,292, which is a (Continued)

(51) Int. Cl.
*F26B 17/14*    (2006.01)
(52) U.S. Cl.
CPC ...... *F26B 17/1425* (2013.01); *F26B 2200/06* (2013.01)

(58) Field of Classification Search
CPC F26B 17/1425; F26B 2200/006; F26B 23/00; F26B 23/007; F26B 17/00;
(Continued)

(56) References Cited

U.S. PATENT DOCUMENTS 2,245,664 A    6/1941    Gronert
2,962,818 A    12/1960    Forth
(Continued)

FOREIGN PATENT DOCUMENTS

BY    13728    1/2010
CA    2901070 A1 *    2/2016    ............ F26B 17/122
(Continued)

OTHER PUBLICATIONS

Danish Patent and Trademark Office—Search Opinion for Danish Patent Application No. PA 2017 00254 Oct. 17, 2017.
(Continued)

*Primary Examiner* — Stephen M Gravini
(74) *Attorney, Agent, or Firm* — Christopher A. Proskey; BrownWinick Law Firm

(57) ABSTRACT

An improved grain dryer is presented having a mixed-flow heating section having a plurality of inlet ducts connected to the plenum that facilitate air flow into the grain column from the heated and pressurized heat plenum, and a plurality of exhaust ducts connected to openings in the exterior wall that facilitate air flow out of the grain column. Outer most ducts of the inlet and exhaust ducts, which are positioned closest to end walls of the grain column, are configured to reduce bridging or grain between the outer most ducts and the end walls of the grain column.

21 Claims, 25 Drawing Sheets

Related U.S. Application Data continuation of application No. 16/990,257, filed on Aug. 11, 2020, now Pat. No. 11,193,711, which is a continuation-in-part of application No. 16/258,158, filed on Jan. 25, 2019, now Pat. No. 10,767,926, which is a continuation-in-part of application No. 15/131,865, filed on Apr. 18, 2016, now Pat. No. 10,378,820.

(60) Provisional application No. 62/937,627, filed on Nov. 19, 2019.

(58) Field of Classification Search
CPC ........ F26B 17/128; F26B 3/14; F26B 17/126; F26B 21/04; Y02P 70/405; Y02P 70/40
USPC .................................................... 34/168, 476
See application file for complete search history.

(56) References Cited

U.S. PATENT DOCUMENTS

| | | |
|---|---|---|
| 3,129,073 A | 4/1964 | Mathews |
| 3,237,315 A | 3/1966 | Benecke |
| 3,300,873 A | 1/1967 | Bussell |
| 3,896,562 A | 7/1975 | Zimmerman |
| 4,125,945 A | 11/1978 | Westelaken |
| 4,242,634 A | 12/1980 | Metcalf |
| 4,242,806 A | 1/1981 | McClaren |
| 4,249,891 A | 2/1981 | Noyes et al. |
| 4,263,722 A | 4/1981 | Botkins |
| 4,398,356 A | 8/1983 | Westelaken |
| 4,404,756 A | 9/1983 | Noyes |
| 4,502,229 A | 3/1985 | Kitzman |
| 4,800,653 A | 1/1989 | Steffen |
| 4,914,834 A | 4/1990 | Sime |
| 5,046,265 A | 9/1991 | Kalb |
| 5,228,207 A | 6/1993 | Michel et al. |
| 5,653,043 A | 8/1997 | Bestwick |
| 6,122,838 A | 9/2000 | Bloemendaal |
| 6,457,256 B1 | 10/2002 | Middaugh |
| 6,834,442 B1 | 12/2004 | Bloemendaal |
| 7,544,031 B2 | 6/2009 | Kaeb |
| 7,818,894 B2 | 10/2010 | Noyes |
| 9,506,693 B2 | 11/2016 | Pauling |
| 9,835,375 B2 | 12/2017 | Bloemendaal |
| 9,863,703 B2 * | 1/2018 | Morrison ................ F26B 17/12 |
| 9,915,474 B2 * | 3/2018 | Pauling .................. F26B 17/14 |
| 10,378,820 B2 | 8/2019 | Heilskov |
| 10,767,926 B2 | 9/2020 | Heilskov |
| 11,067,337 B2 | 7/2021 | Heilskov |
| 11,193,711 B2 | 12/2021 | Heilskov |
| 11,835,292 B2 | 12/2023 | Heilskov |
| 2006/0123655 A1 | 6/2006 | Valfioani |
| 2013/0014404 A1 | 1/2013 | Bloemendaal |
| 2015/0260455 A1 | 9/2015 | Lallouet |
| 2015/0369537 A1 | 12/2015 | Meier |
| 2017/0152110 A1 | 6/2017 | Rauser |
| 2022/0146197 A1 | 5/2022 | Heilskov |
| 2024/0027131 A1 * | 1/2024 | Heilskov ............. F26B 17/1425 |

FOREIGN PATENT DOCUMENTS

| | | | |
|---|---|---|---|
| CA | 2882505 C * | 9/2018 | .............. F26B 17/12 |
| EP | 2647935 | 7/2016 | |
| RU | 2183308 | 6/2002 | |
| RU | 2261404 | 9/2005 | |
| RU | 80545 | 2/2009 | |
| SU | 1502924 | 8/1989 | |

OTHER PUBLICATIONS

Russian Federal Institute of Industrial Property—Search Report for Application No. 2017112710/06(022285) Apr. 13, 2017.

* cited by examiner

BRIDGE REDUCING MIXED-FLOW GRAIN DRYER WITH CROSS-FLOW VACUUM COOL HEAT RECOVERY SYSTEM

CROSS REFERENCE TO RELATED APPLICATIONS

This application is a continuation of U.S. Utility application Ser. No. 17/516,105 which was filed on Nov. 1, 2021 entitled "BRIDGE REDUCING MIXED-FLOW GRAIN DRYER WITH CROSS-FLOW VACUUM COOL HEAT RECOVERY SYSTEM", which is a continuation of U.S. Utility application Ser. No. 16/990,257 which was filed on Aug. 11, 2020 entitled "BRIDGE REDUCING MIXED-FLOW GRAIN DRYER WITH CROSS-FLOW VACUUM COOL HEAT RECOVERY SYSTEM", which is a continuation in part of U.S. Utility application Ser. No. 16/258,158 which was filed on Jan. 25, 2019 entitled "MIXED-FLOW GRAIN DRYER WITH CROSS-FLOW VACUUM COOL HEAT RECOVERY SYSTEM", which is a continuation in part of U.S. Utility application Ser. No. 15/131,865 which was filed on Apr. 18, 2016, the entirety of which is incorporated herein fully by reference herein.

U.S. Utility application Ser. No. 16/990,257 which was filed on Aug. 11, 2020 also claims priority to U.S. Provisional Patent Application. 62/937,627, which was filed on Nov. 19, 2019 entitled "BRIDGE REDUCING MIXED-FLOW GRAIN DRYER WITH CROSS-FLOW VACUUM COOL HEAT RECOVERY SYSTEM", the entirety of which is incorporated herein fully by reference herein.

FIELD OF THE DISCLOSURE

This disclosure relates to generally to the grain handling, grain storage and grain conditioning arts. More specifically and without limitation, this disclosure relates to the grain drying arts. More specifically and without limitation, this disclosure relates to an improved grain dryer and grain drying system known as a mixed-flow grain dryer with a cross-flow vacuum cool heat recovery system.

Overview

Grain dryers are old and well known in the art. Grain dryers are commonly used to dry various types of grain, such as corn, wheat, rice, sorghum, and the like, so as to allow the grain to be stored in bulk, such as in a grain bin, tote or other bulk grain storage device, for extended periods of time. If grain is stored in bulk with a moisture content that is too high, the grain will spoil. As such, particular care is taken to ensure that grain that is to be stored does not too high a moisture content.

Optimally drying grain is a particularly complex, difficult and delicate matter. Care must be taken to ensure that the grain is dried enough to have a low enough moisture content to ensure that it does not spoil while being stored. However, it is also undesirable to overly dry grain.

Overly drying grain is wasteful in various ways. Overly drying grain consumes additional and unnecessary fuel used to dry the grain beyond the moisture content level that is needed for stable storage. Overly drying grain often takes additional and unnecessary time to dry the grain beyond the moisture content level that is needed for stable storage. Overly drying grain can damage the grain by causing it to be burned, cracked or otherwise damaged, which can reduce the value of the grain. Overly drying grain can reduce the test weight of the grain thereby causing a deduction in the price of the grain when it is sold. For these and other reasons, overly drying grain is undesirable.

As such, optimally drying grain requires striking a delicate balance between overly drying grain on one side, and not drying grain enough on the other side.

Various configurations of grain dryers have been developed to help facilitate efficient grain drying. However, all of the presently available grain dryers suffer from various disadvantages.

Cross-Flow Grain Dryers: One form of a grain dryer is what is known as a cross-flow grain dryer. Cross-flow grain dryers are known for having a pair of grain columns on each side that are formed by perforated screens. A plenum, or open space, is positioned between the grain columns. Wet grain is loaded into the grain columns using a loading system. The wet grain travels down the grain columns under the force of gravity, between the perforated screens. As the wet grain travels down the grain columns, between the perforated screens, heated air is blown into the plenum. This heated air flows outward from the plenum and through the columns of grain. As the heated air blows through the columns of grain, the heated air warms the grain and carries away moisture from the grain. Dry grain is unloaded from the grain columns using an unloading system. In this way, the grain is dried.

Cross-flow grain dryers suffer from many disadvantages. One disadvantage of cross-flow grain dryers is that they are relatively harsh on grain. This is because the grain toward the interior side of the grain columns is often exposed to high levels of heat which can cause the interior-positioned grain to crack, burn, and/or be overly dried. Another disadvantage of cross-flow grain dryers is that the grain within the grain columns tends to dry in an uneven manner. That is, the grain positioned toward the interior side of the grain column has a tendency to be dried more than the grain positioned toward the exterior side of the grain column. Another disadvantage of cross-flow is that they tend to require relatively high operating pressures and high air-flow. Another disadvantage of cross-flow grain dryers is that they tend to consume a lot of fuel, or said another way they are energy inefficient. Another disadvantage of cross-flow grain dryers is the screens tend to get covered and plugged with fines from the grain which affects the operational characteristics of the grain dryer as well as requires periodic cleaning.

For these and other reasons, cross-flow grain dryers suffer from many disadvantages and are undesirable to use.

Mixed-Flow Grain Dryers: One form of a grain dryer is what is known as a mixed-flow grain dryer. Mixed-flow grain dryers are known for having a pair of grain columns on each side that have a plurality inlet ducts and exhaust ducts that extend across the grain column. A plenum, or open space, is positioned between the grain columns. Wet grain is loaded into the grain columns using a loading system. The wet grain travels down the grain columns under the force of gravity. As the wet grain travels down the grain columns, between the interior wall and exterior wall of the grain columns, heated air is blown into the plenum. This heated air flows into the inlet ducts through the columns of grain and out the exhaust ducts. As the heated air blows through the columns of grain, the heated air warms the grain and carries away moisture from the grain. Dry grain is unloaded from the lower end of each of the grain columns using an unloading system. In this way, the grain is dried.

Mixed-flow grain dryers suffer from many disadvantages. One disadvantage of mixed-flow grain dryers is that they do not allow for heat recovery and as such they waste energy and consume unnecessary fuel. Another disadvantage of mixed-flow grain dryers is that each column requires its own unload system. Another disadvantage of mixed-flow grain dryers is that they are susceptible to bridging of grain in grain columns.

For these and other reasons, mixed-flow grain dryers suffer from many disadvantages and are undesirable to use.

Therefore, for all the reasons stated above, and the reasons stated below, there is a need in the art for a grain drying system that improves upon the state of the art.

Thus, it is a primary objective of the disclosure to provide a grain dryer system that improves upon the state of the art.

Another object of the disclosure is to provide a grain dryer system that is efficient to use.

Yet another object of the disclosure is to provide a grain dryer system that facilitates heat recovery.

Another object of the disclosure is to provide a grain dryer system that reduces fuel consumption.

Yet another object of the disclosure is to provide a grain dryer system that is gentle on grain.

Another object of the disclosure is to provide a grain dryer system does not damage grain when drying.

Yet another object of the disclosure is to provide a grain dryer system that does not overly dry grain.

Another object of the disclosure is to provide a grain dryer system that facilitates cooling of grain before it is discharged.

Yet another object of the disclosure is to provide a grain dryer system that evenly dries grain.

Another object of the disclosure is to provide a grain dryer system that does not have variability of grain quality across the grain column.

Yet another object of the disclosure is to provide a grain dryer system that does not have variability of moisture across the grain column.

Another object of the disclosure is to provide a grain dryer system that can be precisely controlled.

Yet another object of the disclosure is to provide a grain dryer system that provides optimum results.

Another object of the disclosure is to provide a grain dryer system that facilitates unloading of grain from the dryer at a single point.

Yet another object of the disclosure is to provide a grain dryer system that is relatively compact.

Another object of the disclosure is to provide a grain dryer system that is relatively inexpensive.

Yet another object of the disclosure is to provide a grain dryer system that can be used with all kinds of grain.

Another object of the disclosure is to provide a grain dryer system that that minimizes maintenance.

Yet another object of the disclosure is to provide a grain dryer system that requires less cleaning.

Another object of the disclosure is to provide a grain dryer system that is cleaner to use than prior art systems.

Yet another object of the disclosure is to provide a grain dryer system that is safe to use.

Another object of the disclosure is to provide a grain dryer system that reduces the potential for a fire.

Yet another object of the disclosure is to provide a grain dryer system that requires less air pressure.

Another object of the disclosure is to provide a grain dryer system that requires less air flow.

Yet another object of the disclosure is to provide a grain dryer system that provides improved grain quality.

Another object of the disclosure is to provide a grain dryer system that is easy to use.

Yet another object of the disclosure is to provide a grain dryer system that has a robust design.

Another object of the disclosure is to provide a grain dryer system that is high quality.

Yet another object of the disclosure is to provide a grain dryer system that incorporates the benefits of mixed-flow grain dying with the benefits of cross-flow vacuum cooling.

Another object of the disclosure is to provide a grain dryer system that provides a unique solution to grain drying needs.

Yet another object of the disclosure is to provide a grain dryer system that reduces bridging of grain.

SUMMARY OF THE DISCLOSURE

An improved mixed-flow grain dryer with cross-flow vacuum cool heat recovery system is presented. The grain dryer system includes a loading system positioned at its upper end and an unloading system positioned at its lower end. Once loaded into the dryer, grain passes through the grain dryer under the force of gravity in a grain column positioned on each side of a centrally positioned plenum. A wet holding section is positioned at the upper end of the grain dryer and receives wet grain from the loading system. The wet holding section directs the grain into the grain columns. A heating section is positioned just below the wet holding section and receives wet grain from the wet grain section. The grain column of the heating section is formed by a solid interior wall and a solid exterior wall. A plurality of inlet ducts is connected to openings in the interior wall that facilitate air flow into the grain column from the heated and pressurized heat plenum. A plurality of exhaust ducts is connected to openings in the exterior wall that facilitate air flow out of the grain column. In this way, air flows from the heated and pressurized heat plenum, through the openings in the interior wall and into the connected inlet duct, through the grain column, into the exhaust ducts and out the connected openings in the exterior wall. In this way, the heated and pressurized air in the heat plenum gently flows through the grain column thereby heating and drying the grain. A tempering section is positioned just below the heating section and receives heated and dried grain from the heating section. The tempering section has a solid interior wall and a solid exterior wall that prevents air flow through the grain column in the tempering section. A cooling section is positioned just below the tempering section and receives heated and dried grain from the tempering section. The grain column of the cooling section is formed by a perforated interior wall and a perforated exterior wall. Air is pulled through the perforated exterior wall, through the grain column and through the perforated interior wall and into the cool plenum under vacuum formed by a fan connected to the cool plenum of the cooling section. As the air is pulled through the grain column of the cooling section, the grain is cooled and the air is heated. An unloading system is positioned just below the cooling section and receives cooled and dried grain from the cooling section. The unloading system unloads the grain from the drain dryer system. A fan having adjustable louvers is connected to the cool plenum of the cooling section. The fan pulls air through the grain column of the cooling section which heats the air while cooling the grain. This heated air is heated further by a heater. This heated air is then blown into the heat plenum thereby pressurizing the heat plenum. In this way, a mixed-flow grain dryer with cross-flow vacuum cool is presented that harnesses the benefits of mixed-flow heating and cross-flow vacuum cooling that provides gentler drying and increased efficiency.

DETAILED DESCRIPTION OF THE DISCLOSURE

Figure 1:
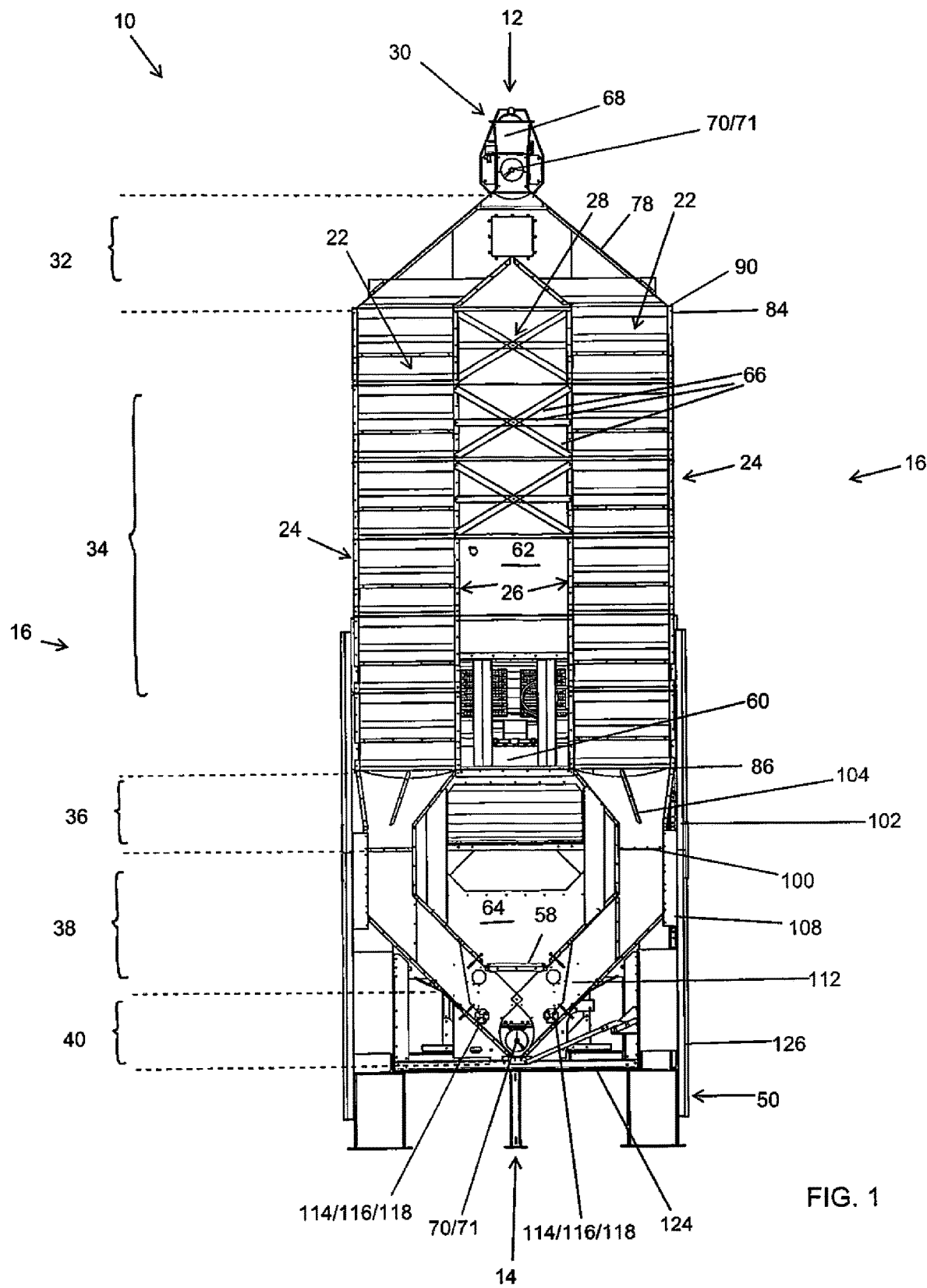
FIG. 1 is a side sectional view of a mixed-flow grain dryer with cross-flow vacuum cool heat recovery system.
Figure 2:
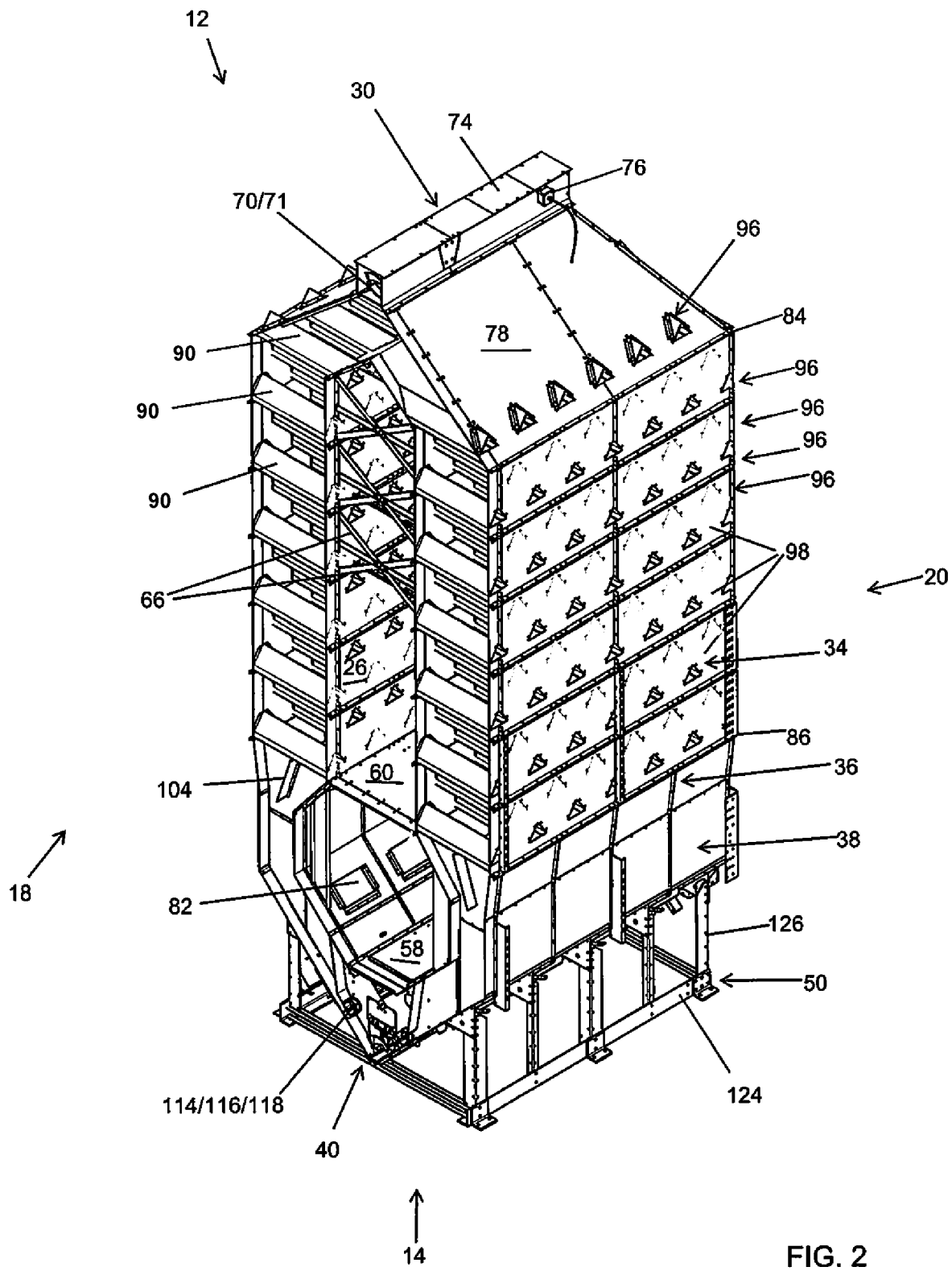
FIG. 2 is a perspective sectional view of a mixed-flow grain dryer with cross-flow vacuum cool heat recovery system.
Figure 3:
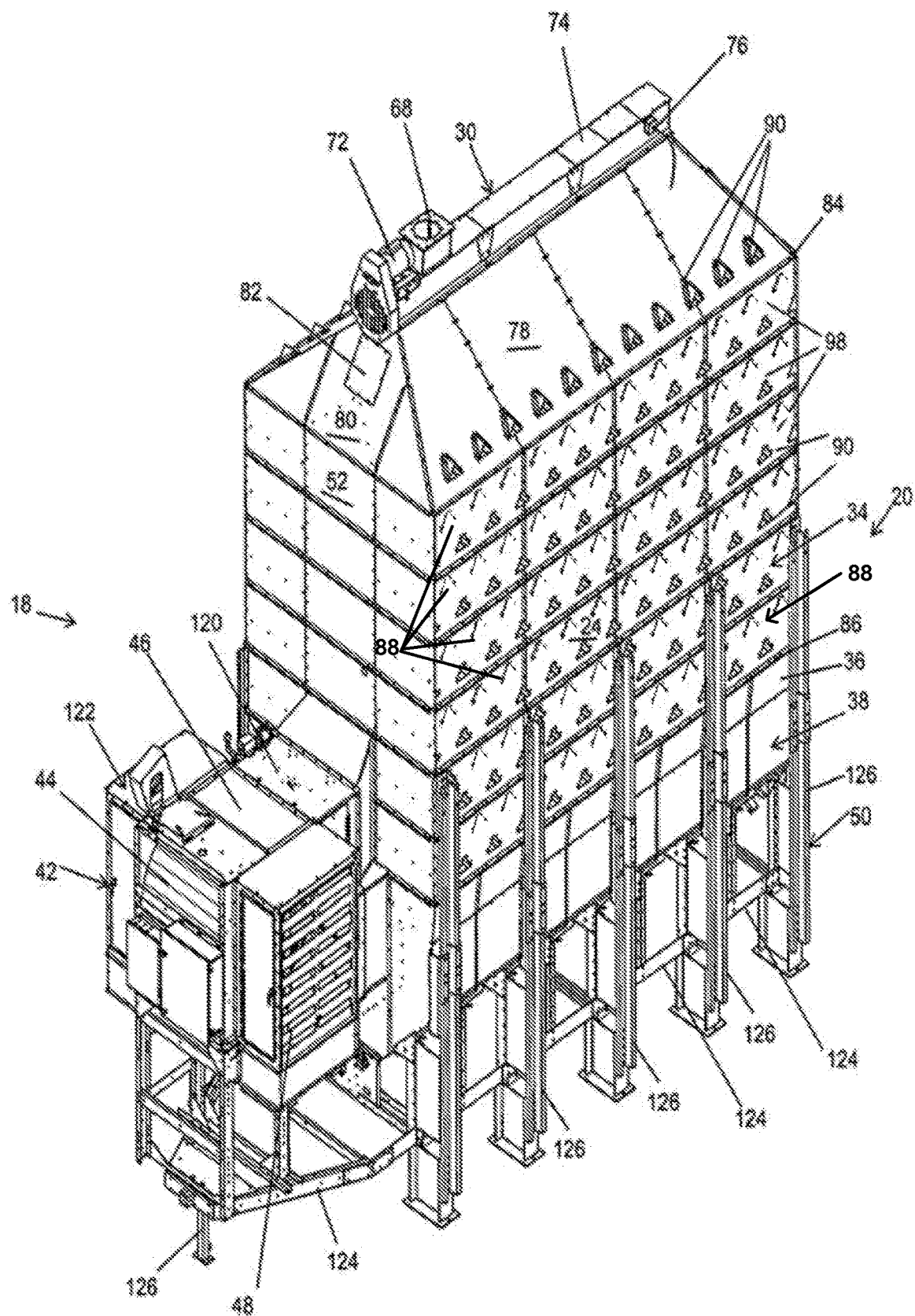
FIG. 3 is a perspective view of a mixed-flow grain dryer with cross-flow vacuum cool heat recovery system.
Figure 4:
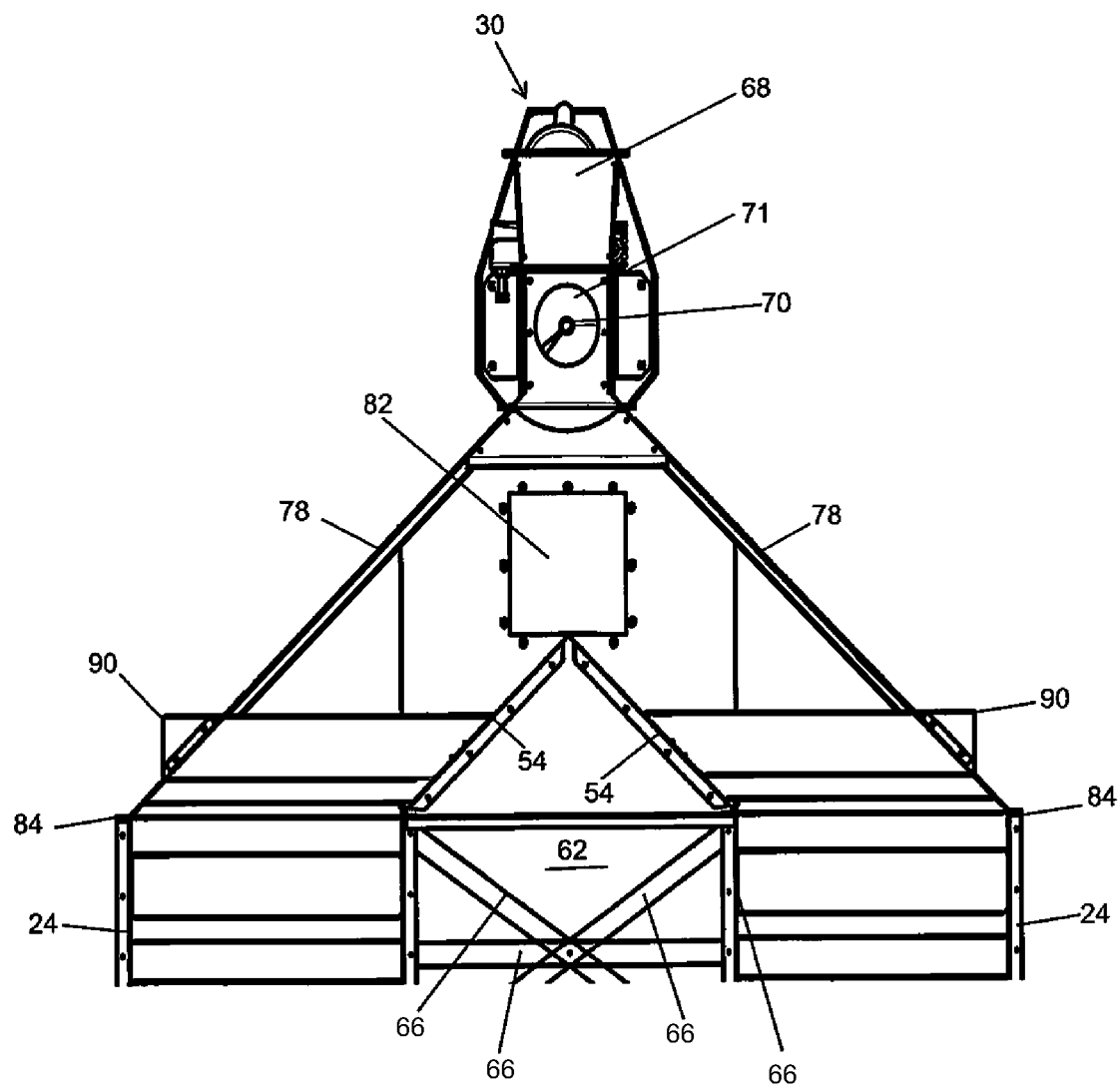
FIG. 4 is a close up view of the upper end of FIG. 1.
Figure 5:
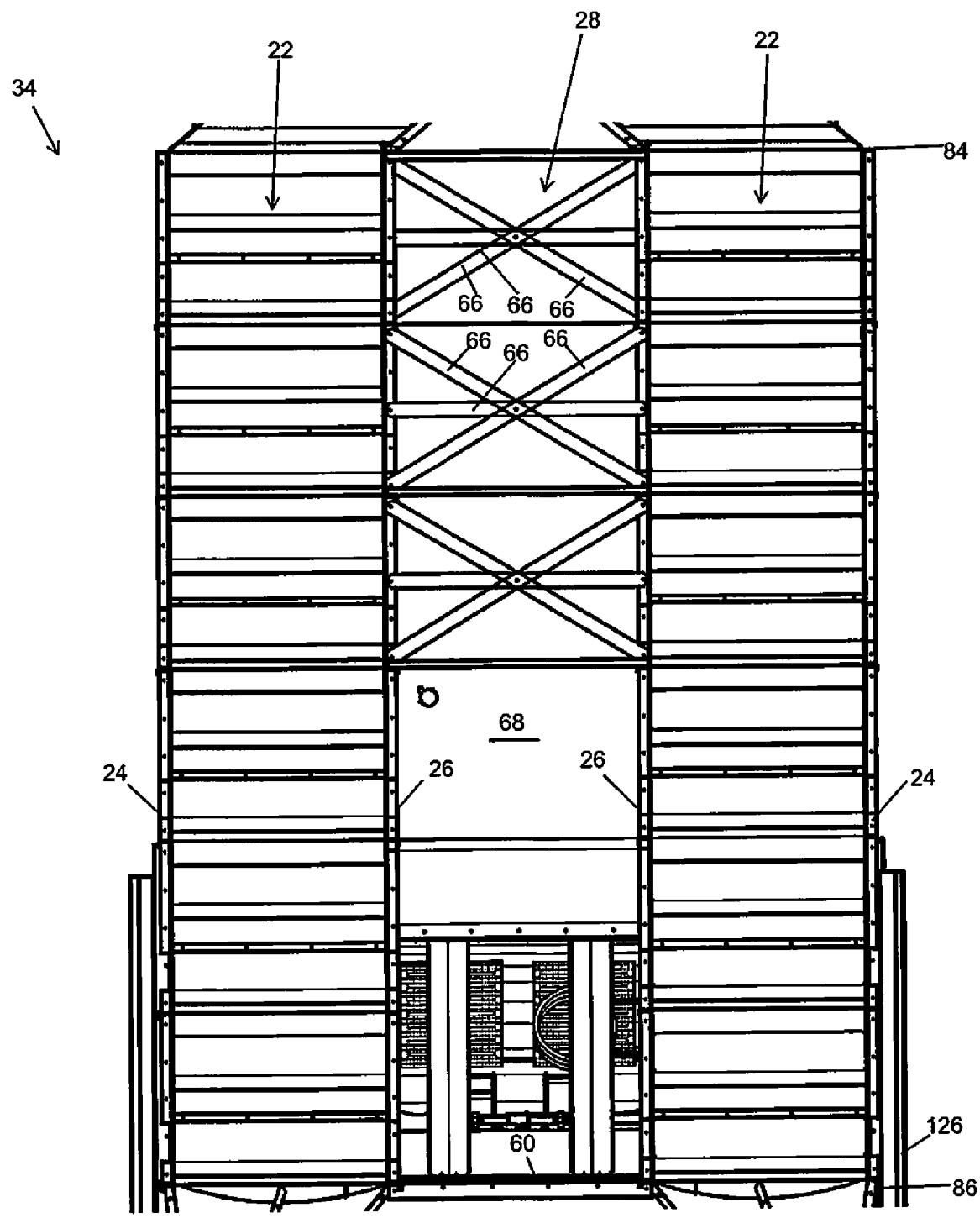
FIG. 5 is a close up view of the middle portion of FIG. 1, the view showing the mixed-flow heating section.
Figure 6:
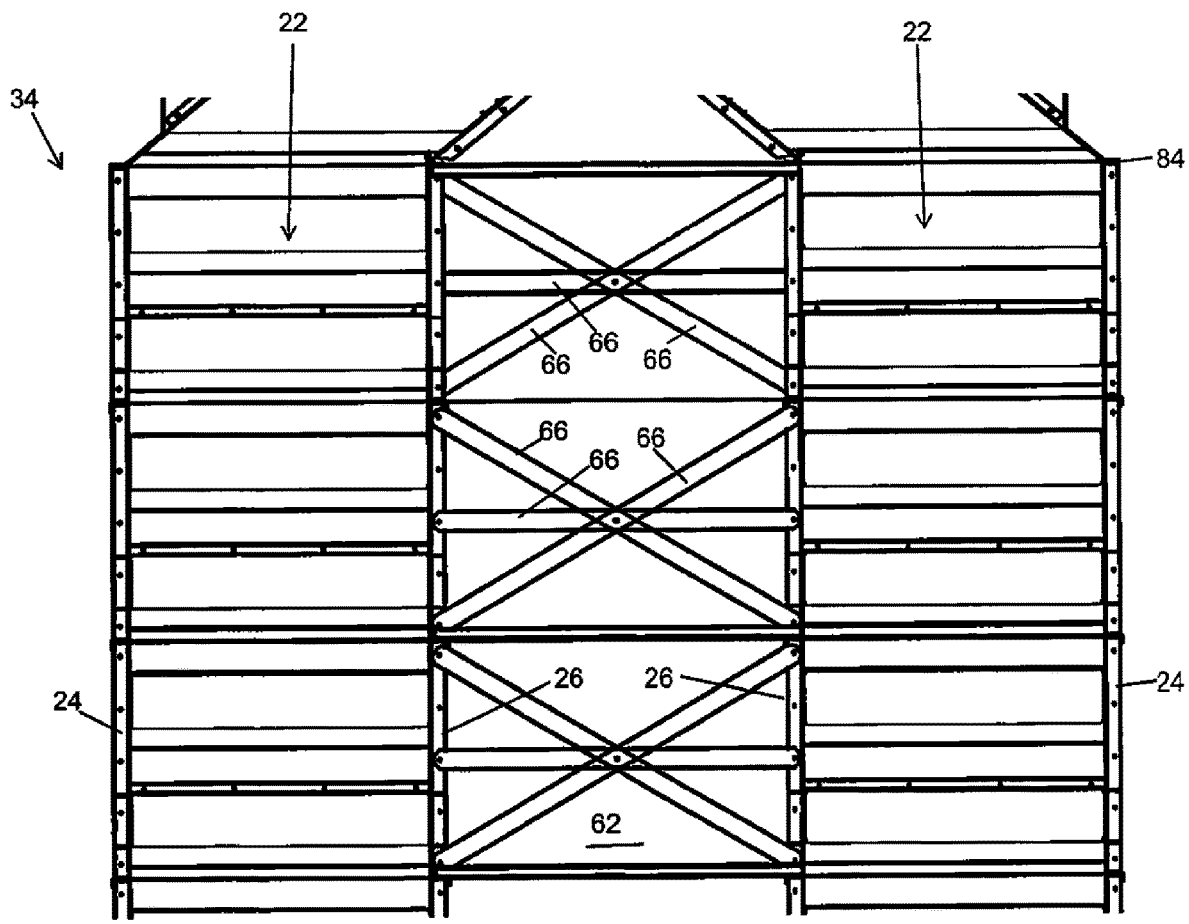
FIG. 6 is a close up view of the upper portion of FIG. 5, the view showing the upper portion of the mixed-flow heating section.
Figure 7:
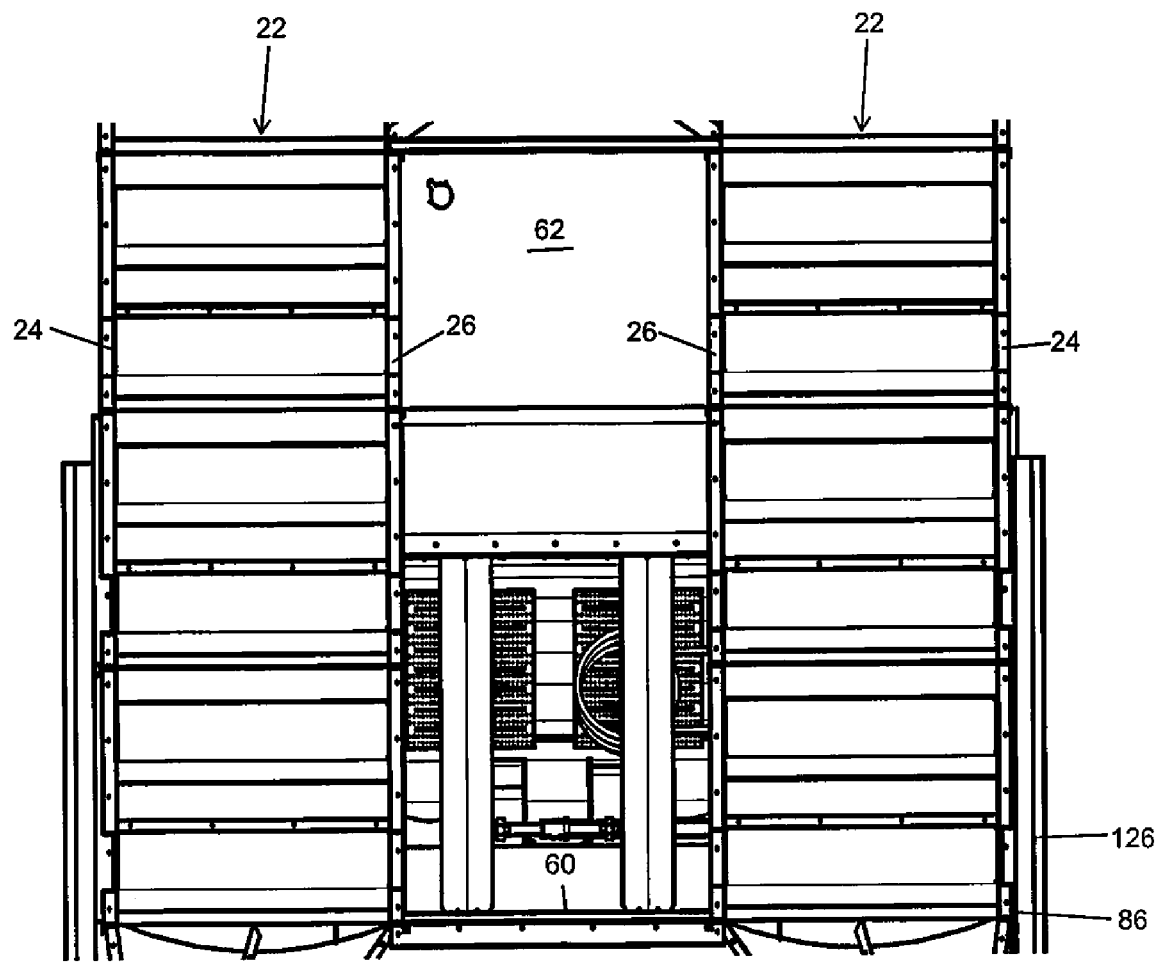
FIG. 7 is a close up view of the lower portion of FIG. 5, the view showing the lower portion of the mixed-flow heating section.
Figure 8:
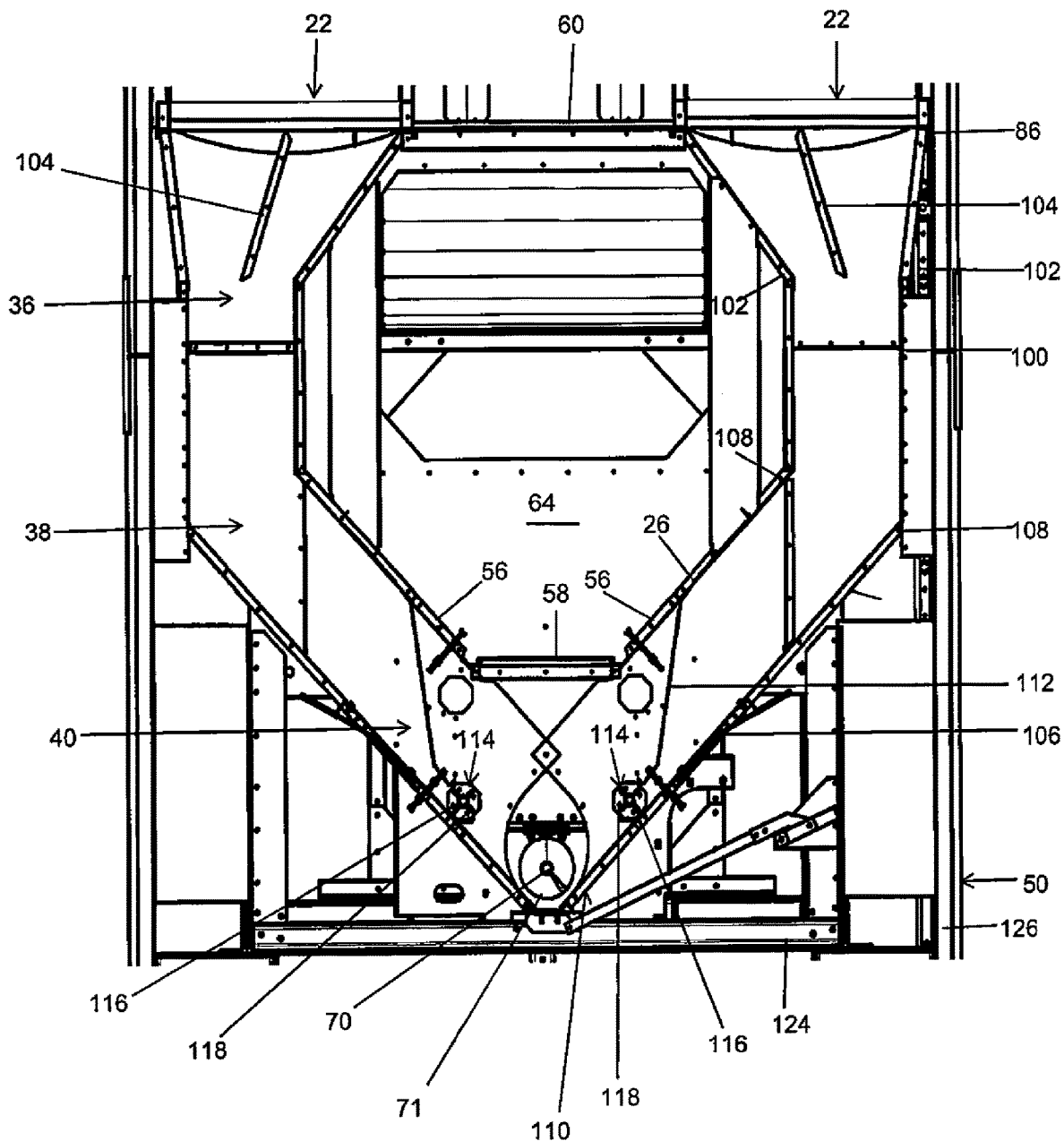
FIG. 8 is a close up view of the lower portion of FIG. 1.
Figure 9:
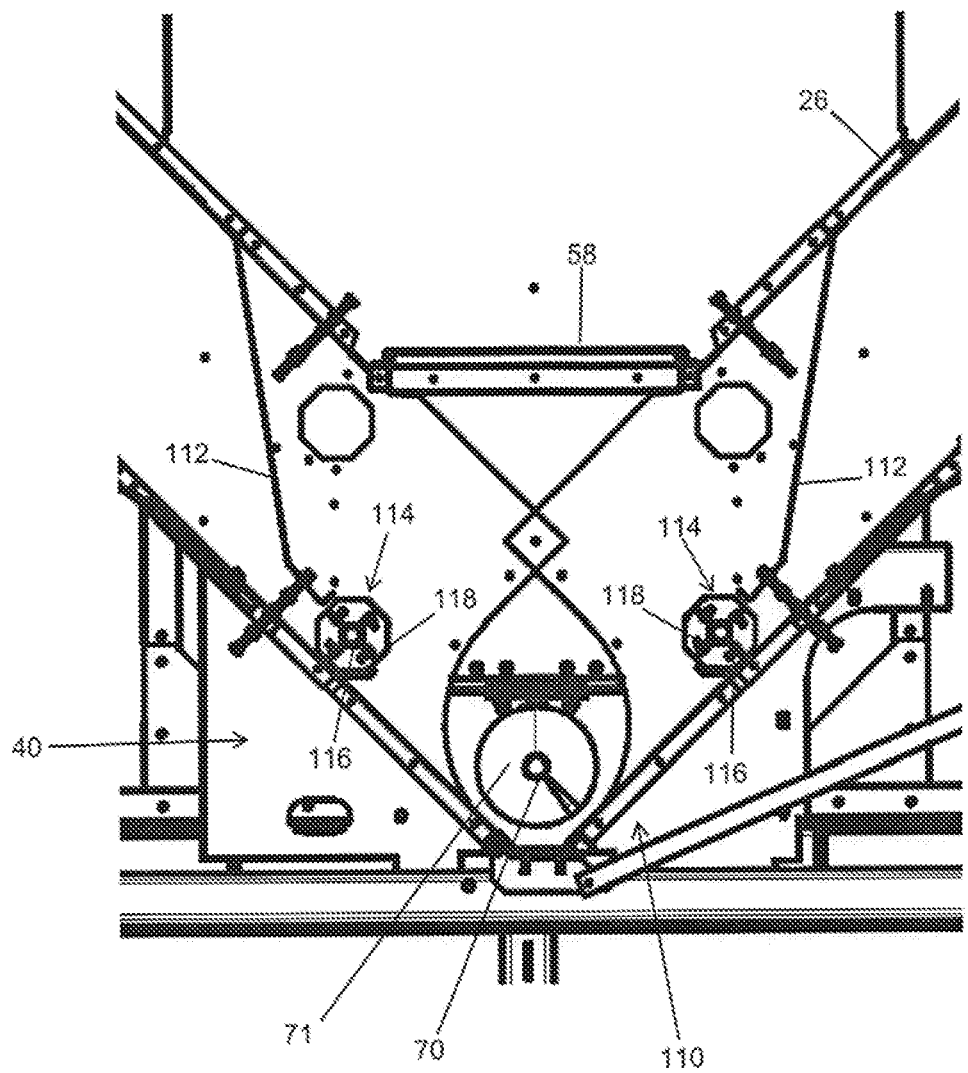
FIG. 9 is a close up view of the lower portion of FIG. 8.
Figure 10:
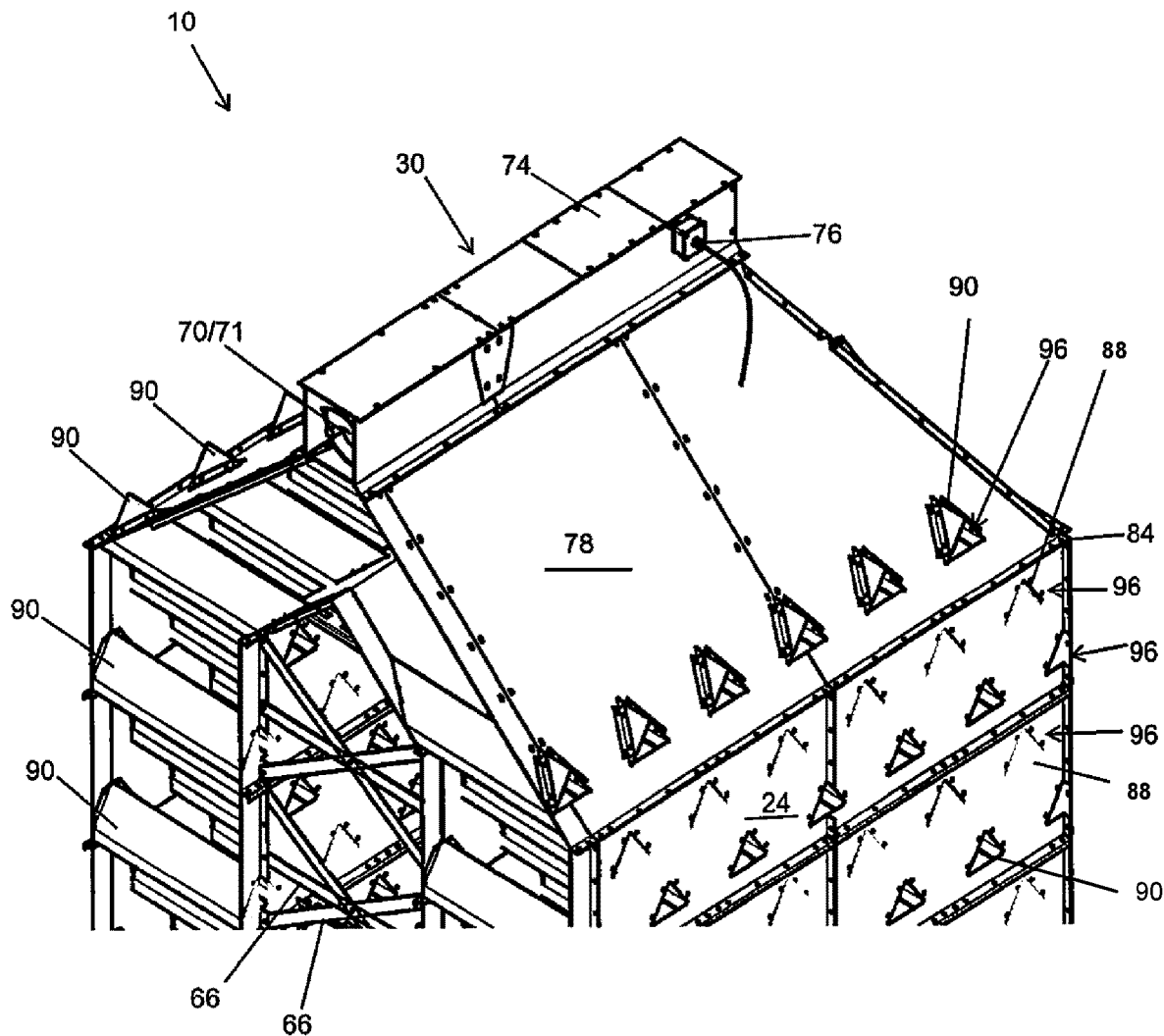
FIG. 10 is a close up view of the upper portion of FIG. 2.
Figure 11:
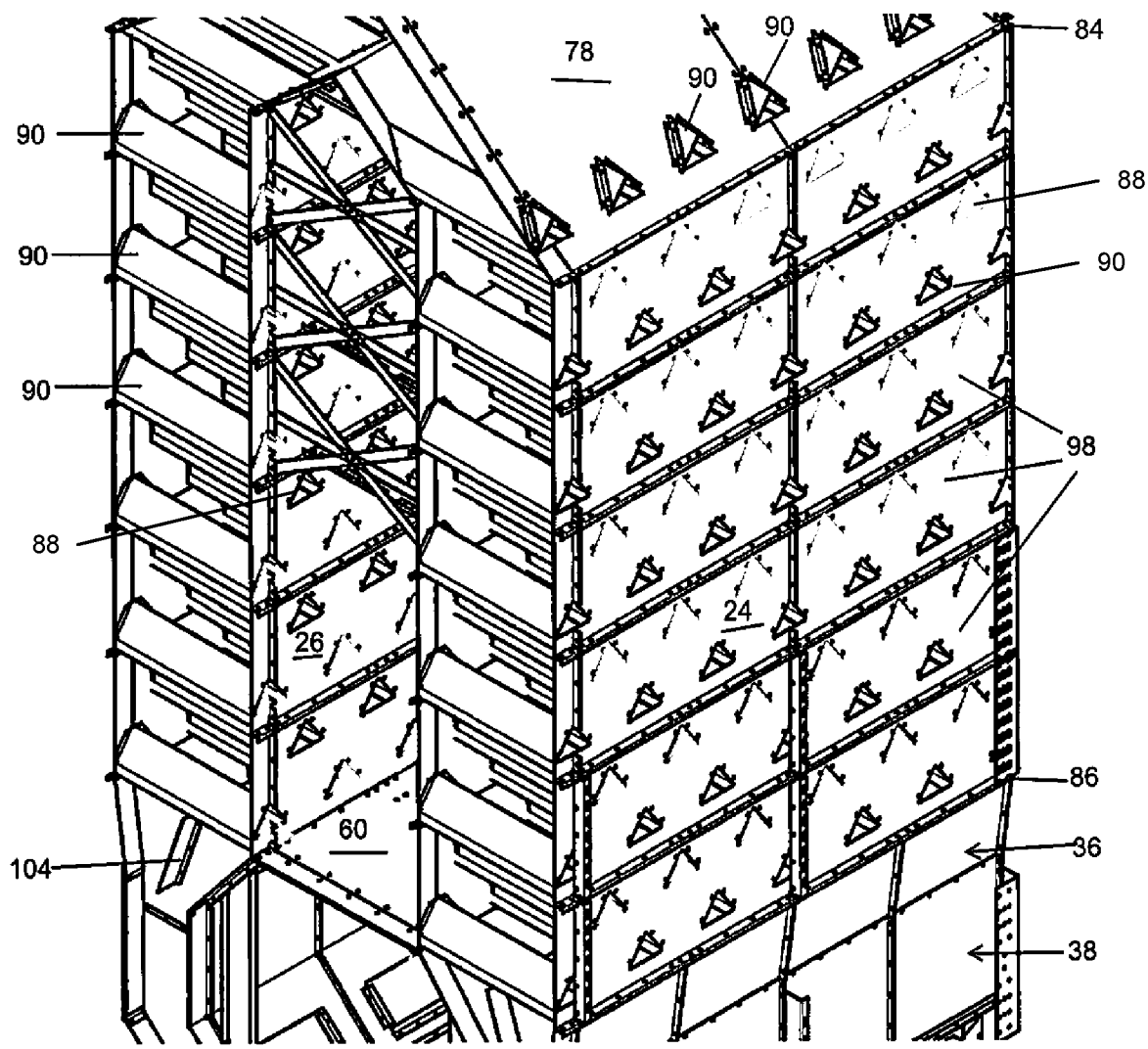
FIG. 11 is a close up view of the middle portion of FIG. 2.
Figure 12:
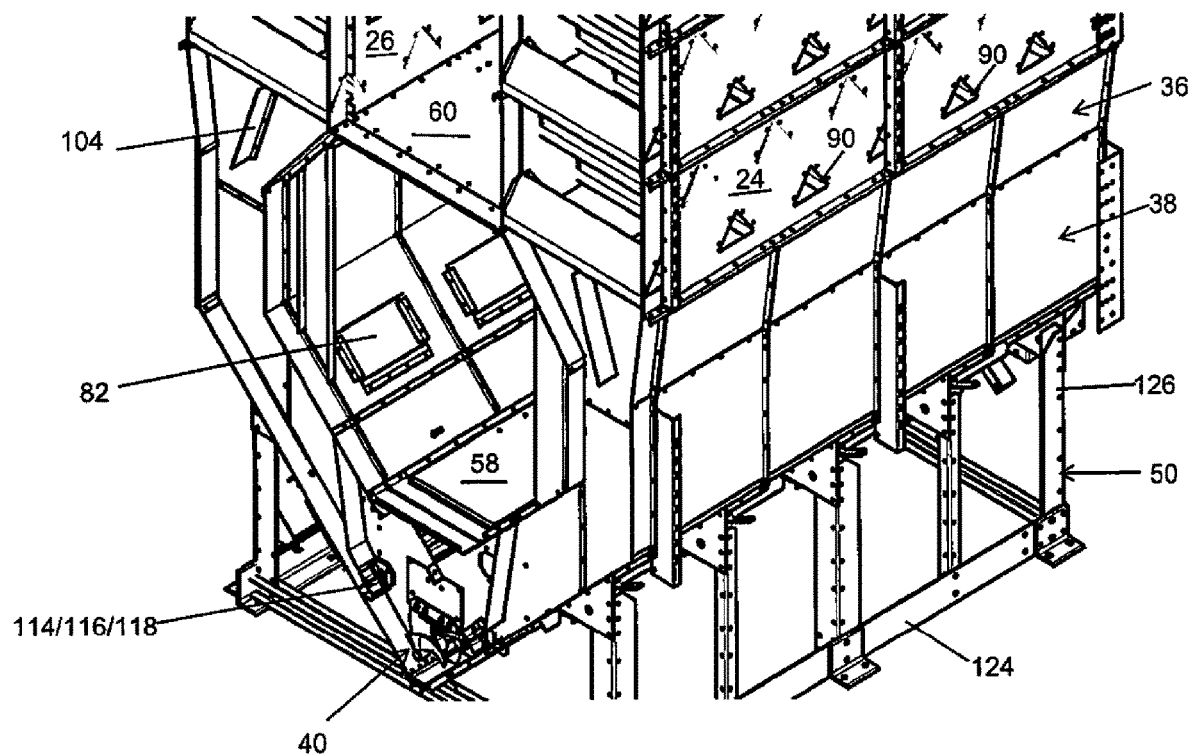
FIG. 12 is a close up view of the lower portion of FIG. 2.
Figure 13:
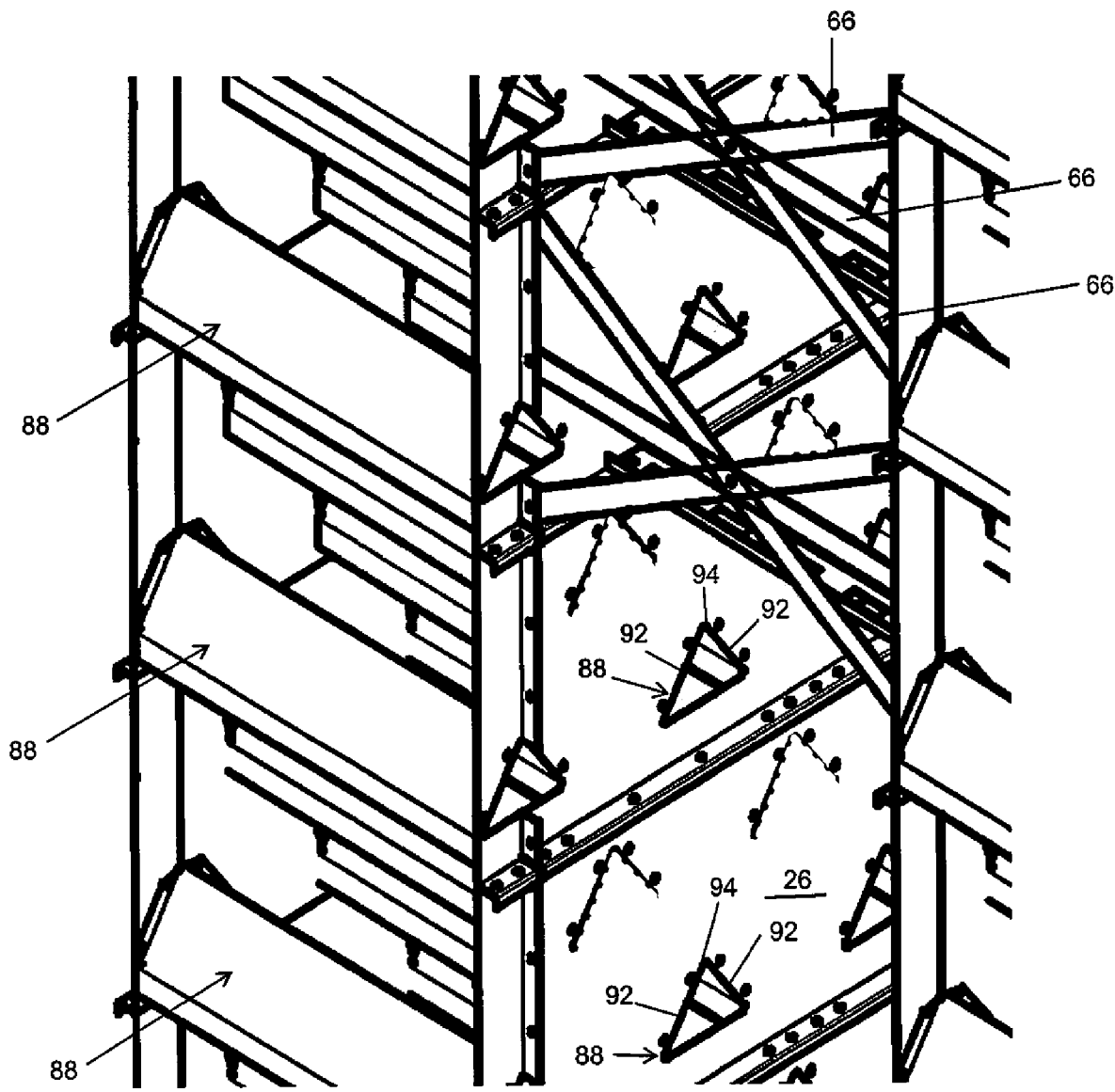
FIG. 13 is a close up view of the middle portion of the left side of FIG. 2.
Figure 14:
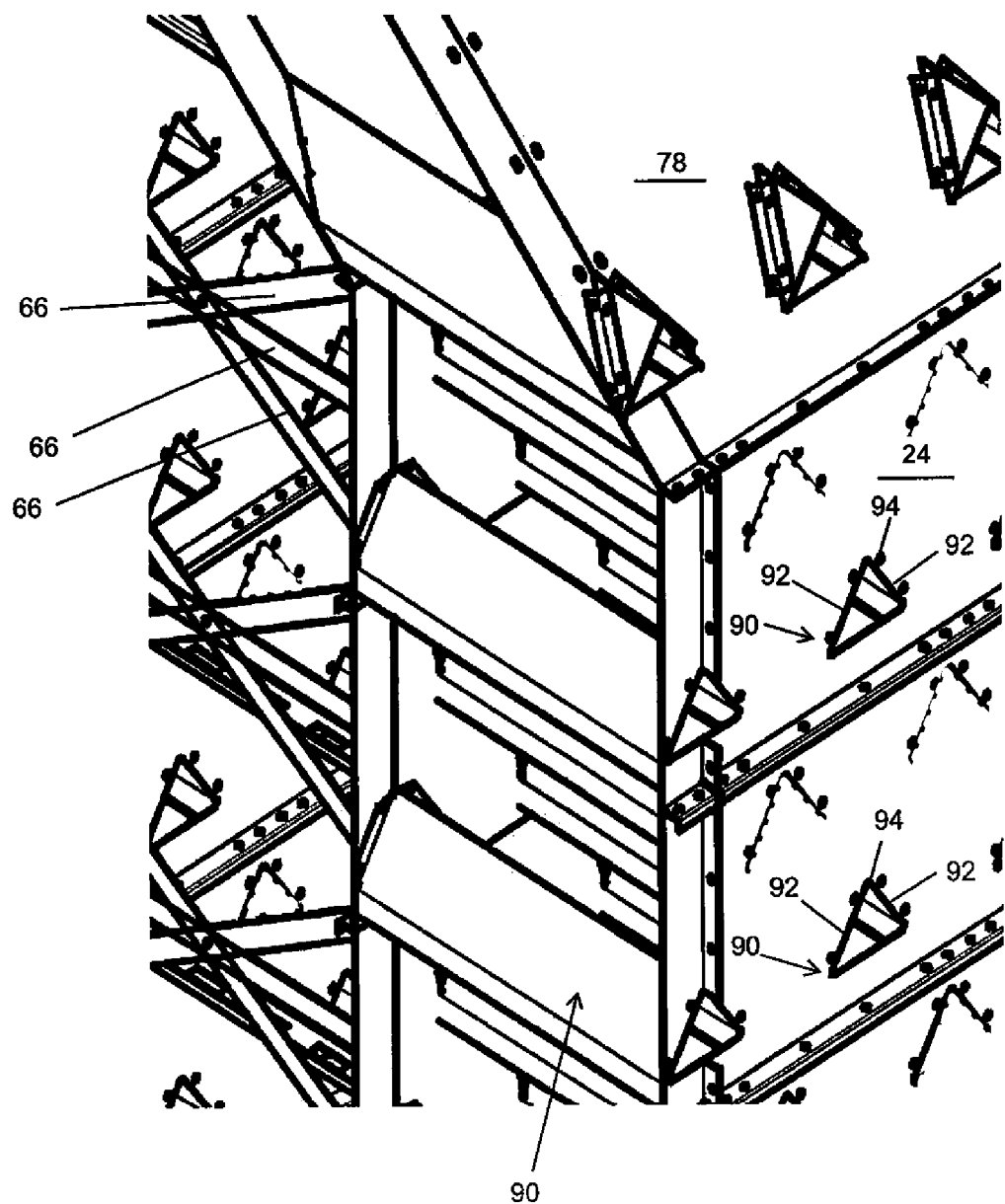
FIG. 14 is a close up view of the middle portion of the right side of FIG. 2.
Figure 15:
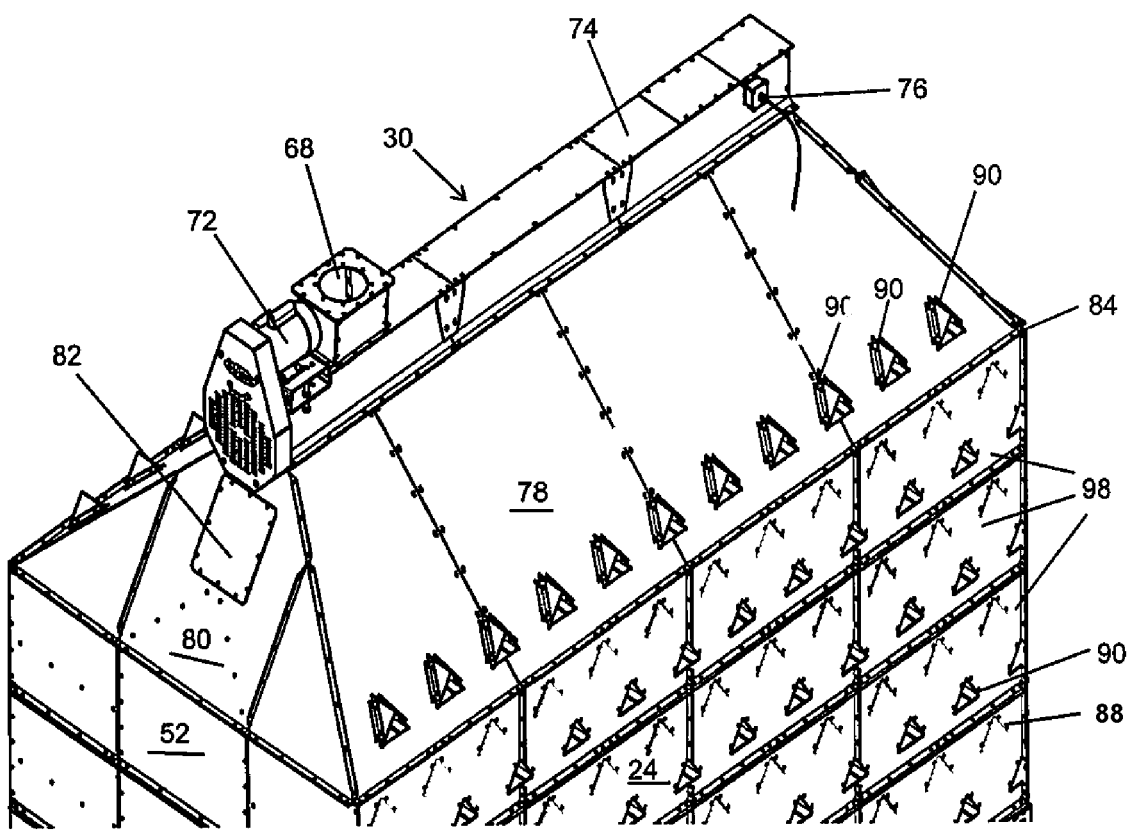
FIG. 15 is a close up view of the upper portion of FIG. 3.
Figure 16:
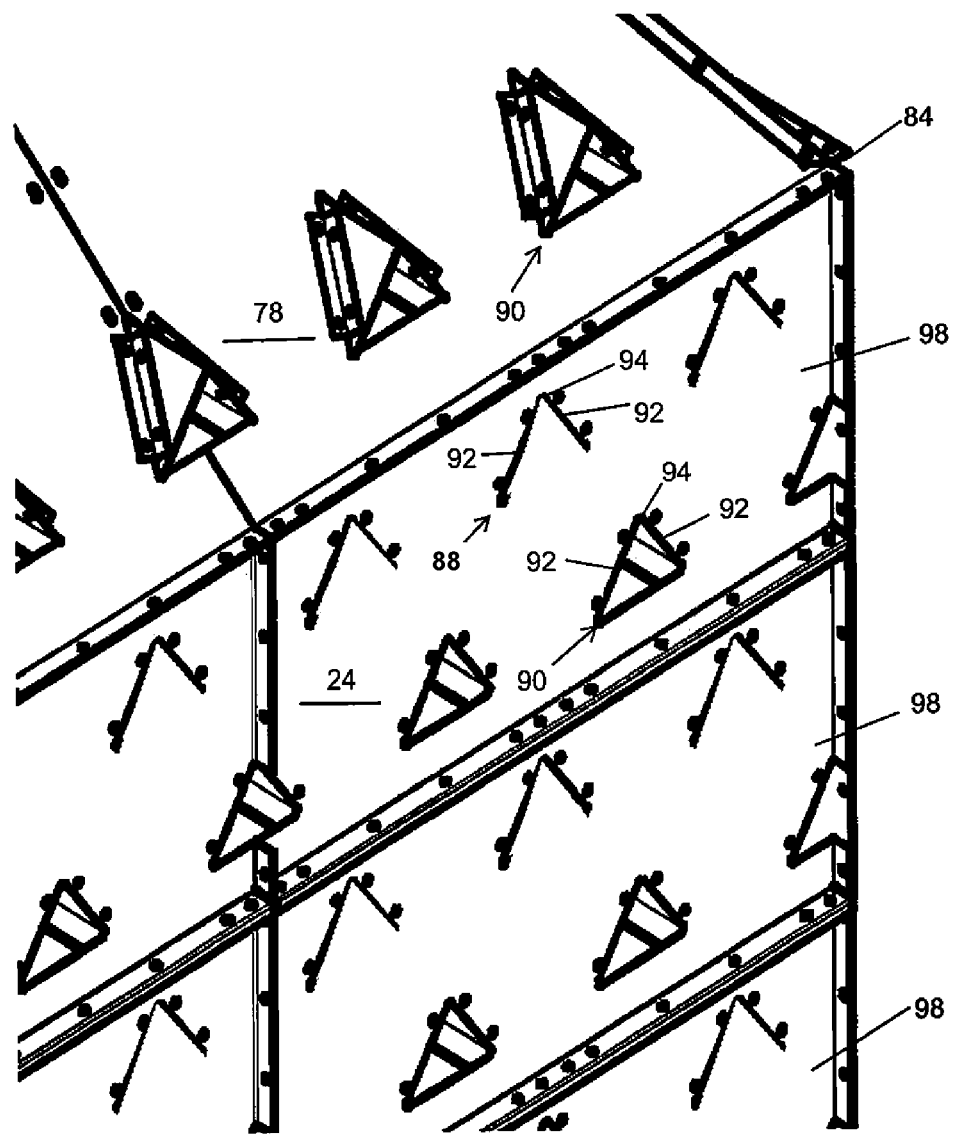
FIG. 16 is a close up view of the upper right portion of FIG. 3.
Figure 17:
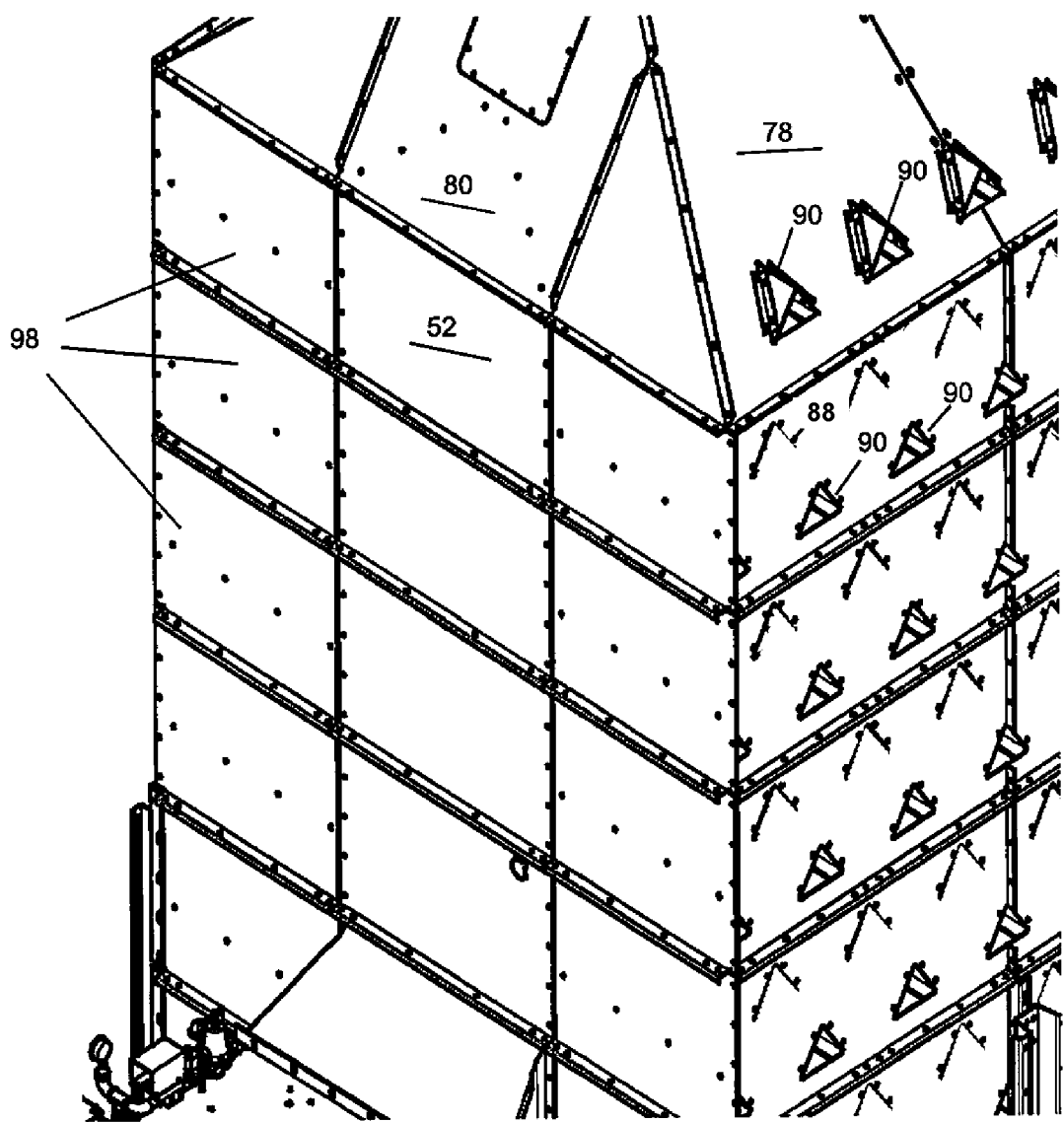
FIG. 17 is a close up view of the middle left portion of FIG. 3.
Figure 18:
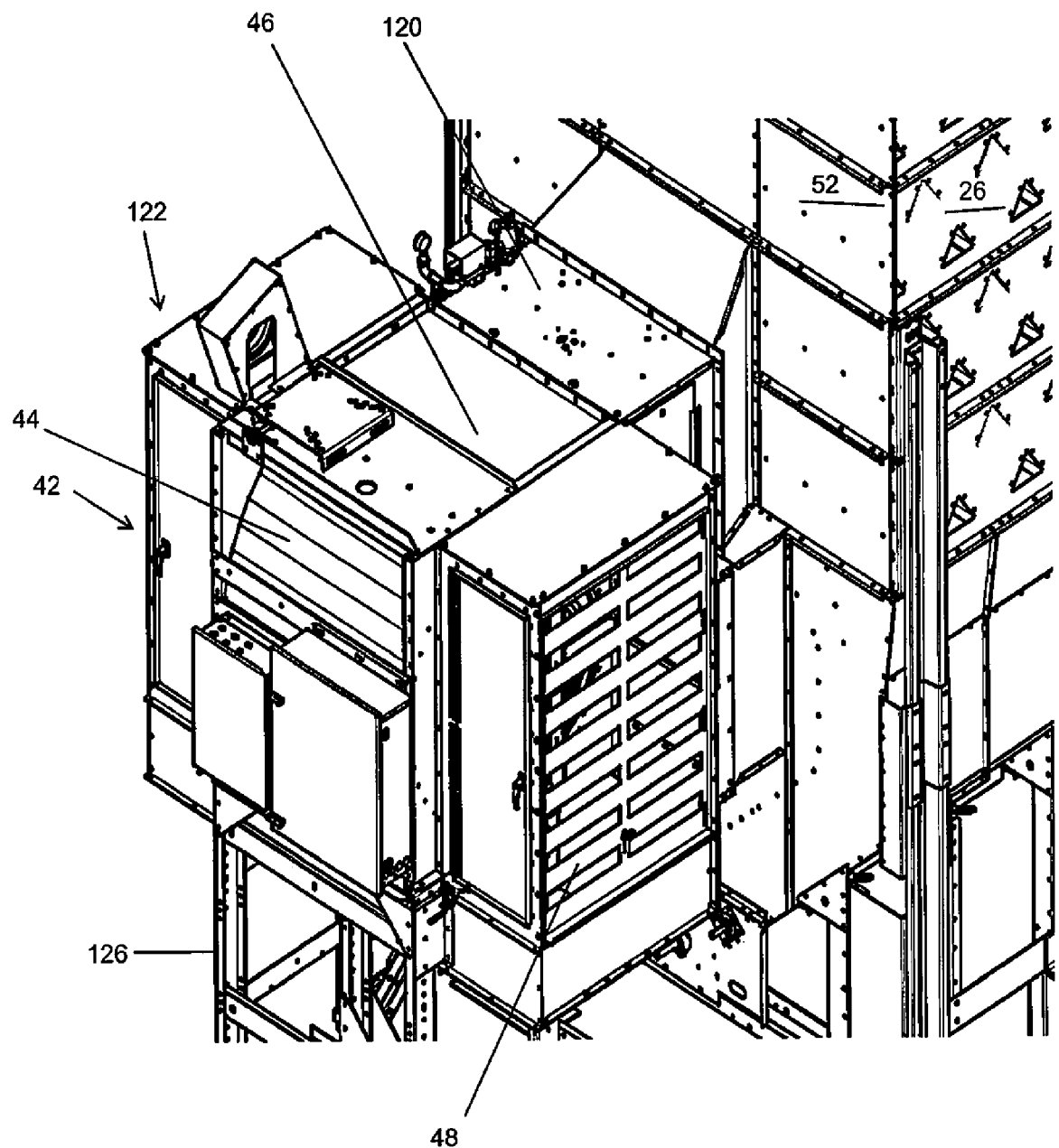
FIG. 18 is a close up view of the lower left portion of FIG. 3.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods. Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of agricultural grain dryers. However, the embodiments are not so limited. It is appreciated that the embodiments may be adapted for use in other agricultural implements and in other applications, which may be improved by the disclosed structures, arrangements and/or methods. The system is merely shown and described as being used in the context of agricultural grain dryers for ease of description and as one of countless examples.

System:

With reference to the figures, a mixed-flow grain dryer with cross-flow vacuum cool heat recovery system 10, mixed flow grain dryer 10, or simply system 10, is presented that extends vertically from an upper end 12 to a lower end 14, extends a width between opposing sides 16, and extends a depth between an opposing forward end 18 and an opposing rearward end 20. Mixed-flow grain dryer with cross-flow vacuum cool heat recovery system 10 is formed of any suitable size, shape and design and is configured to gently and efficiently cool grain while providing a single loading point, a single unloading point and heat recovery. In the arrangement shown, as one example, system 10 includes a pair of grain columns 22 having an exterior wall 24 and an interior wall 26 separated by a plenum 28, a loading system 30, a wet hold section 32, a mixed-flow heating section 34, a tempering section 36, a cross-flow cooling section 38, an unloading system 40, an air handling system 42 having a fan system 44, a heating system 46 and louvers 48, and a support system 50, among other components, structures and features as is further described herein.

In the arrangement shown, as one example, to facilitate even air flow across the system the system 10 is generally symmetric along a vertically extending line that runs through the center of the system 10 between opposing sides 16.

Grain Columns

In the arrangement shown, as one example, mixed-flow grain dryer with cross-flow vacuum cool heat recovery system 10 includes at least one grain column 22. Grain columns 22 are formed of any suitable size, shape and design and are configured to hold grain therein while the grain moves vertically through the system 10 under the force of gravity while being exposed to heating of the mixed-flow heating section 34 and cooling of the cross-flow cooling section 38.

In the arrangement shown, as one example system 10 includes a pair of grain columns 22, with one grain column 22 positioned on each side 16 of system 10. In the arrangement shown, as one example, grain columns 22 extend laterally a width and are bounded on one side by exterior wall 24 and bounded on the opposite side by interior wall 26. Grain columns 22 are bounded at their ends by end walls 52. The interior sides of grain columns 22 are separated by plenum 28. The exterior sides of grain columns 22 connect with the atmosphere surrounding system 10.

In the arrangement shown, as one example, grain columns 22 extend vertically from the lower end of loading system 30 to the upper end of unloading system 40 in a continuous and uninterrupted manner. In this way, when grain enters one of the two of the opposing grain columns 22, the grain travels vertically through the grain column 22 from its upper end to its lower end under the force of gravity while being exposed to the air flow of mixed-flow heating section 34 and cross-flow cooling section 38.

In the arrangement shown, as one example, the grain columns 22 are wider at the mixed-flow heating section 34 than they are at the cross-flow cooling section 38. In the arrangement shown, as one example, the width of grain columns 22 remains generally constant and consistent throughout the length of the heating section 34. In the arrangement shown, as one example, the width of grain columns 22 remains generally constant throughout the length of the cooling section 38, albeit with a turn or angle positioned within the cooling section 38. In the arrangement shown, as one example, tempering section 36 narrows the width of the grain columns 22 by angling the interior wall 26 and exterior wall 24 toward one another such that tempering section 36 transitions the width of the grain column 22 from the wider heating section 34 to the narrower cooling section 38.

While two opposing grain columns 22 are shown in use with system 10, any number of grain columns 22 are hereby contemplated for use such as one, two, three, four, five, six or more. As any other shape or configuration of grain columns 22.

Plenum:

In the arrangement shown, as one example, mixed-flow grain dryer with cross-flow vacuum cool heat recovery system 10 includes a plenum 28. Plenum 28 is formed of any suitable size, shape and design and is configured to provide a space between grain columns 22 so as to facilitate airflow through grain columns 22.

In the arrangement shown, as one example plenum 28 is a generally centrally positioned space that extends between the opposing interior walls 26 of grain columns 22 and extends between the interior surfaces of end walls 52. In the arrangement shown, as one example, the upper end of plenum 28 is bounded by the angled lower walls of wet hold section 32. In the arrangement shown, as one example, the lower end of plenum 28 is bounded by the angled upper walls 56 of unloading system 40 and/or divider 58 positioned adjacent upper walls 56 of unloading system 40. In this way, plenum 28 extends the entire interior height of system 10.

In the arrangement shown, as one example, a divider 60 extends across plenum 28. Divider 60 separates plenum 28 into a heat plenum 62, which is positioned above divider 60, and a cool plenum 64, which is positioned below divider 60.

Heat Plenum: Heat plenum 62 is formed of any suitable size, shape and design and is configured to receive heated air from air handling system 42 which is blown outward through the grain column 22 of the heating section 34. In the arrangement shown, as one example, heat plenum 62 is bounded on its lower end by divider 60, is bounded on its exterior sides by interior walls 26 of heating section 34, is bounded on its upper end by lower walls 54 of wet hold section 32, and is bounded at its ends by interior surfaces of end walls 52. In the arrangement shown, as one example, the width of heat plenum 62 remains generally constant from its upper end to its lower end, albeit with a peak at its upper end formed by the angled lower walls 54 of wet hold section 32.

In the arrangement shown, as one example, a plurality of structural members 66 extend across heat plenum 62. Structural members 66 are formed of any suitable size, shape and design and are configured to connect the opposing sides of system 10 so as to provide structural support and rigidity and strength to the large and tall system 10. In the arrangement shown, as one example, a plurality of structural members 66 extend between opposing interior walls 26 of heat plenum 62. More specifically, in the arrangement shown, three sets of three structural members 66 are placed in an X-formation with a centrally extending structural member 66 extending through the center of each X-formation. In this way, structural members 66 bridge the width of heat plenum 62 thereby connecting opposing interior sides of heat plenum 62 while not inhibiting air flow through heat plenum 62. Any other configuration of structural members 66 is hereby contemplated for use.

In the arrangement shown, as one example, heat plenum 62 is connected to and receives output from air handling system 42, or more specifically fan system 44 and heating system 46. In this way, heat plenum 62 receives heated and pressurized air from air handling system 42. This heated and pressurized air is pushed or blown outward through the grain column of mixed-flow heating section 34 as is further described herein.

Cool Plenum: Cool plenum 64 is formed of any suitable size, shape and design and is configured to receive vacuum from air handling system 42 which causes air to be pulled through the grain column 22 of the cooling section 38 and into cool plenum 64. In the arrangement shown, as one example, cool plenum 64 is bounded on its upper end by divider 60, is bounded on its exterior sides by interior walls 26 of cooling section 38, is bounded on its lower end by upper walls 56 of unloading system 40 as well as divider 58, and is bounded at its ends by interior surfaces of end walls 52. In the arrangement shown, as one example, the width of cool plenum 64 varies as the interior wall 26 angles outward at the upper end of tempering section 36, extends vertically at the upper end of cooling section 38, angles inward at the lower end of cooling section 38, and is bounded at its lower end by the upper surface of divider 58 that extends in generally parallel spaced relation to divider 60.

In the arrangement shown, as one example, cool plenum 64 does not include any structural members 66 that extend across the cool plenum 64. In an alternative arrangement, cool plenum 64 includes one or more structural members 66 that extend across cool plenum 64 similar to the heat plenum 62.

In the arrangement shown, as one example, cool plenum 64 is connected to the input of air handling system 42, or more specifically fan system 44. In this way, cool plenum 64 feeds air into air handling system 42 and therefore cool plenum 64 is under vacuum or negative pressure. The vacuum or negative pressure of cool plenum 64 causes air to be drawn, pulled or sucked through the grain column of cross-flow cooling section 38 as is further described herein.

Loading System:

In the arrangement shown, as one example, mixed-flow grain dryer with cross-flow vacuum cool heat recovery system 10 includes a loading system 30. Loading system 30 is formed of any suitable size, shape and design and is configured to facilitate loading of wet grain into system 10.

Any form of a grain loading system is hereby contemplated for use as loading system 30. In the arrangement shown, as one example loading system 30 is an auger system having an input 68, that receives grain from a chute or other device. A shaft 70 with flighting 71 extends across the upper end of system 10. The shaft 70 with flighting 71 is connected to a motor 72 by a pulley and belt system and is configured to rotate the shaft 70 with flighting 71. A housing 74 is positioned over and around the shaft 70 with flighting 71 so as to constrain the grain moved by the shaft 70 with flighting 71. In the arrangement shown, housing 74 is generally square or rectangular with an open lower end that connects to wet hold section 32 so as to facilitate the transfer of grain from the loading system 30 to the wet hold section 32.

In operation, as motor 72 operates, while grain is loaded into loading system 30, the shaft with flighting 71 rotates thereby moving the grain across the upper end of system 10 evenly distributing wet grain across the upper end of system 10, or more specifically across the upper end of wet hold section 32. In the arrangement shown, as one example, a sensor 76 is positioned adjacent one end of loading system 30, or more specifically adjacent one end of shaft 70 with flighting 71. When loading system 30 and/or wet hold section 32 is filled with grain, sensor 76 detects this filled condition. This information is then used to stop the rotation of loading system 30 and/or to stop loading grain into input 68 and/or to shut down or stop any other component of the system. Once the grain is consumed from the area around sensor 76, loading system 30 may again resume operation and the loading of grain. In the arrangement shown, as one example, one or more sensors 76 are positioned on an end of shaft 70 with flighting 71 opposite input 68.

While in the arrangement shown, only a single auger, or shaft 70 with flighting 71 is used, it is hereby contemplated that multiple augers or multiple shafts 70 with flighting 71 are used in loading system 30. Also, while in the arrangement shown, the input 68 is positioned adjacent one end of the loading system 30 and the sensor 76 is positioned adjacent the opposite end of the loading system 30, it is hereby contemplated that grain may be loaded at the middle of loading system 30 and moved outward to the ends using shaft 70 with flighting 71. Alternatively, a gravity fill system is hereby contemplated for use. Alternatively, a belt, a conveyor, a paddle sweep and/or a drag chain system is hereby contemplated for use as loading system 30. Any other structure or configuration of a system for loading grain is hereby contemplated for use as loading system 30.

Wet Hold Section:

In the arrangement shown, as one example, mixed-flow grain dryer with cross-flow vacuum cool heat recovery system 10 includes a wet hold section 32. Wet hold section 32 is formed of any suitable size, shape and design and is configured to hold and stage a quantity of wet grain prior to the grain passing through the grain columns 22.

In the arrangement shown, as one example, wet hold section 32 connects at its upper end to the lower end of loading system 30 and connects at its lower end to the upper end of mixed-flow heating section 34. In the arrangement shown, as one example, wet hold section 32 starts the formation of grain columns 22.

In the arrangement shown, as one example, the upper side of wet hold section 32 includes upper side walls 78 and upper end walls 80 that enclose the upper end of wet hold section 32. In the arrangement shown, as one example, upper side walls 78 connect at their upper end to the lower end of the sides of housing 74 of loading system 30, and upper side walls 78 connect at their lower end to the upper end of exterior walls 24. Similarly, in the arrangement shown, as one example, upper end walls 80 connect at their upper end to the lower end of the ends of housing 74 of loading system 30, and upper end walls 80 connect at their lower end to the upper end of end walls 52. In the arrangement shown, as one example, upper side walls 78 and upper end walls 80 extend downward at an angle as they extend outward thereby forming a sloped roof at the upper end of system 10.

In the arrangement shown, as one example, a door 82 is positioned in one or both upper end walls 80. Door 82 is formed of any suitable size, shape and design and is configured to provide access to the hollow interior of wet hold section 32 so as to facilitate repair and cleaning of the components of wet hold section 32. Additional doors 82 may be placed in other parts wet hold section 32, such as upper side walls 78, or for that matter in any other part of system 10 such as the interior wall 26 of grain columns 22 as well as any other place or position.

In the arrangement shown, as one example, the lower side of wet hold section 32 includes lower walls 54 that enclose the lower end of wet hold section 32. In the arrangement shown, as one example, lower walls 54 connect at their upper end to one another thereby forming a peak at the approximate upper center end of plenum 28. This peak divides or directs the grain held within wet hold section 32 into one or the other grain columns 22. Similarly, in the arrangement shown, as one example, lower walls 54 connect at their lower end to the upper end of interior wall 26.

As grain moves through wet hold section 32 from loading system 30 and into grain columns 22, grain is directed by the angling of the upper side walls 78 and upper end walls 80 on the upper side, and the lower walls 54 on the lower side. The volumetric holding capacity of wet hold section 32 ensures that an adequate buffer of wet grain is on hand at all times to ensure the grain columns 22 are always filled while accommodating loading variability during use. In this way, wet hold section 32 stages grain for drying in grain columns 22 as well as directs grain into grain columns 22 under the force of gravity. To be clear, in a manner of speaking, grain columns 22 begin in wet hold section 32 between upper side walls 78 and lower walls 54.

Mixed-Flow Heating Section:

In the arrangement shown, as one example, mixed-flow grain dryer with cross-flow vacuum cool heat recovery system 10 includes a mixed-flow heating section 34. Mixed-flow heating section 34 is formed of any suitable size, shape and design and is configured to facilitate drying of grain in grain columns 22 in a gentle and efficient manner.

In the arrangement shown, as one example mixed-flow heating section 34 extends vertically from its upper end 84, at the lower end of wet hold section 32, to its lower end 86, at the upper end of tempering section 36. Mixed-flow heating section 34 is defined at its outward sides by the exterior surface of exterior walls 24. Mixed-flow heating section 34 is defined at its outward ends by the exterior surface of end walls 52.

In the arrangement shown, as one example, grain columns 22 extend through mixed-flow heating section 34 from its upper end 84 to its lower end 86. More specifically, in the arrangement shown, as one example, grain columns 22 of heating section 34 have a generally consistent width and shape from upper end 84 to lower end 86. That is, grain columns 22 of heating section 34 are defined at their outward sides by the interior surface of exterior walls 24 and at their inward sides by the interior surface of interior walls 26, wherein exterior walls 24 and interior walls 26 extend in approximate parallel spaced relationship to one another from upper end 84 to lower end 86. Similarly, grain columns 22 of heating section 34 are defined at their outward ends by the interior surface end walls 52, wherein end walls 52 extend in approximate perpendicular relationship to exterior walls 24 and interior walls from upper end 84 to lower end 86. In this way, grain columns 22 of heating section 34 are generally square or rectangular in shape.

In the arrangement shown, as one example, the interior ends of opposing grain columns 22 of mixed-flow heating section 34 are separated from one another by heat plenum 62 of plenum 28. To provide enhanced strength and rigidity, a plurality of structural members 66 extend across heat plenum 62 in a crossing pattern thereby connecting one grain column 22 to the other grain column 22. Heat plenum 62 receives heated and pressurized air from air handling system 42. This heated and pressurized air received by heat plenum 62 passes through a series of inlet ducts 88, through the grain in grain column 22, and through a series of exhaust ducts 90.

Inlet ducts 88 and exhaust ducts 90 may be formed of any suitable size, shape and design and are configured to allow the flow of heated air through the grain in grain column 22 of heating section 34 so as to facilitate gentle heating and drying of the grain. In the arrangement shown, as one example, when viewed from a side 16, inlet ducts 88 and exhaust ducts 90 are generally triangular shaped members having a pair of opposing walls 92 that connect to one another at their upper end at a peak 94 and extend outward and downward from the peak 94 at an angle before terminating their lower ends. The lower ends of inlet ducts 88 and exhaust ducts 90 are open, thereby allowing for the free flow of air into the inlet ducts 88 and exhaust ducts 90 from their open lower end.

In one arrangement, the lower end of inlet ducts 88 and exhaust ducts 90 are completely open. This configuration of having an open lower end of inlet ducts 88 and exhaust ducts 90 is acceptable in many applications due to the manner in which grain moves through grain columns 22 under the force of gravity which prevents the grain from escaping through the open lower end of inlet ducts 88 and exhaust ducts 90. In another arrangement the lower end of inlet ducts 88 and exhaust ducts 90 are covered by a screen, a perforated sheet or another component that allows air flow there through while preventing animals and birds from entering the grain column 22 and/or heat plenum 62 and/or preventing grain from escaping inlet ducts 88 and exhaust ducts 90.

Inlet ducts 88 and exhaust ducts 90 extend a length between opposing ends. In the arrangement shown, as on example, inlet ducts 88 and exhaust ducts 90 extend approximately the width of grain column 22 of heating section 34. In this way, the interior end of inlet ducts 88 and exhaust ducts 90 is positioned at, in or adjacent to the interior wall 26 of grain columns 22. Similarly, the exterior end of inlet ducts 88 and exhaust ducts 90 is positioned at, in or adjacent to the exterior wall 24 of grain columns 22. In the arrangement shown, as one example, the interior end of inlet ducts 88 and exhaust ducts 90 is connected to the interior wall 26 of grain columns 22, and the exterior end of inlet ducts 88 and exhaust ducts 90 is connected to exterior wall 24. In this way, the interior end and exterior end of inlet ducts 88 and exhaust ducts 90 are rigidly supported within grain column 22.

In the arrangement shown, as one example, inlet ducts 88 and exhaust ducts 90 are arranged in rows or tiers 96 that extend from the forward end 18 of heating section 34 to the rearward end 20 of heating section 34 with each inlet duct 88 or exhaust duct 90 spaced from the inlet duct 88 or exhaust duct 90 on either side. In the arrangement shown, as one example, inlet ducts 88 are arranged in tiers 96, and exhaust ducts 90 are arranged in tiers 96. In the arrangement shown, as one example, heating section 34 is formed of alternating tiers 96 of inlet ducts 88 and tiers 96 of exhaust ducts 90. Or, said another way, each tier 96 includes only inlet ducts 88 or exhaust ducts 90, and each tier 96 of inlet ducts 88 has a tier 96 of exhaust ducts 90 above as well as below the tier 96 of inlet ducts 88, and similarly, each tier 96 of exhaust ducts 90 has a tier 96 of inlet ducts 88 above as well as below the tier 96 of exhaust ducts 90.

However, any other configuration or arrangement of inlet ducts 88 and exhaust ducts 90 is hereby contemplated for use such as tiers 96 having an alternating pattern of an inlet duct 88 next to an exhaust duct 90 or any other arrangement or configuration.

Also, in the arrangement shown, as one example, the tiers 96 of inlet ducts 88 and exhaust ducts 90 are laterally offset from one another. That is, the inlet ducts 88 are laterally offset from the exhaust ducts 90 of the adjacent tiers 96. Or, said another way, inlet ducts 88 of one tier 96 are not positioned directly above or below the exhaust ducts 90 of adjacent tiers 96. Instead, inlet ducts 88 of one tier 96 are positioned between the exhaust ducts 90 of vertically adjacent tiers 96, and similarly exhaust ducts 90 of one tier 96 are positioned between the inlet ducts 88 of adjacent tiers 96. This lateral offsetting of vertically adjacent inlet ducts 88 and exhaust ducts 90 helps to cause mixing air flow through the grain in grain column 22. This lateral offsetting of vertically adjacent inlet ducts 88 and exhaust ducts 90 helps to cause the grain to move within grain column 22 as it travels vertically through the grain column 22 by engaging the offset inlet ducts 88 and exhaust ducts 90. This mixing of the airflow as well as mixing of the grain in heat section 34 facilitates consistent and gentle drying of the grain.

In the arrangement shown, as one example, inlet ducts 88 have an open interior end that connects to heat plenum 62. Or, said another way, the interior end of inlet ducts 88 connect to an opening in the interior wall 26. In this way, the open interior end of inlet ducts 88 allow air flow from the pressurized heat plenum 62 and into the inlet ducts 88. Then, due to the open lower end of inlet ducts 88 air passes through the open lower end of inlet ducts 88 and into the grain of grain column 22.

Similarly, in the arrangement shown, as one example, exhaust ducts 90 have an open exterior end that connects to the atmosphere or vents outside of the system 10. Or, said another way, the exterior end of exhaust ducts 90 connect to an opening in the exterior wall 24. In this way, the open lower end of exhaust ducts 90 allows pressurized air flow from the grain column 22 to enter into the exhaust ducts 90. Then, due to the open exterior end of exhaust ducts 90 air passes through the open exterior end of exhaust ducts 90 and into the atmosphere thereby carrying with it moisture from the heated grain.

In the arrangement shown, as one example, heating section 34 is formed by a plurality of panels 98 that form exterior wall 24 as well as interior wall 26. Panels 98 may also be used for end wall 52 as well as other components of the system 10. Each panel 98 includes a plurality of inlet ducts 88 and a plurality of exhaust ducts 90. In the arrangement shown, as one example, each panel 98 includes a tier 96 of exhaust ducts 90 at the lower side of the panel 98 and a tier 96 of inlet ducts 88 at the upper side of the panel 98. However, the opposite arrangement is hereby contemplated for use. These panels 98 are then stacked on top of one another as well as connected to laterally adjacent and vertically adjacent panels 98 thereby forming the grain columns 22 of heat section 34 in a quick and easy and secure manner.

Also, in the arrangement shown, as one example, one tier 96 of exhaust ducts 90 are positioned adjacent the lower end of wet hold section 32. Due to the inward sloping of upper side walls 78 of wet hold section 32, the outer end of exhaust ducts 90 in wet hold section 32 protrude upward out of the exterior sides of upper side walls 78. In the arrangement shown, as one example, mixed-flow heating section 34 is formed of panels 98 stacked six high and four across, each panel 98 having exhaust ducts 90 positioned at their lower end and inlet ducts 88 positioned at their upper end.

In the arrangement shown, the exterior walls 24, interior walls 26 and end walls 52 of grain column 22 of mixed-flow heating section 34 are solid thereby preventing air flow through the exterior walls 24, interior walls 26 and end walls 52 of grain column 22. This is other than the openings in interior walls 26 that inlet ducts 88 connect to and the openings in exterior walls 24 that exterior ducts 90 connect to.

In the arrangement show, as one example, the lower end of mixed-flow heating section 34 connects to the upper end of tempering section 36. The lower end of mixed-flow heating section 34 is enclosed by the upper surface of divider 60. In the arrangement shown, a tier of exhaust ducts 90 are positioned a distance above the lower end 86 of heating section 34.

Tempering Section:

In the arrangement shown, as one example, mixed-flow grain dryer with cross-flow vacuum cool heat recovery system 10 includes a tempering section 36. Tempering section 36 is formed of any suitable size, shape and design and is configured to facilitate the transition of grain from the mixed-flow heating section 34 to the cross-flow cooling section 38.

In the arrangement shown, as one example tempering section 36 extends vertically from its upper end, at the lower end 86 of mixed-flow heating section 34, to its lower end 100, at the upper end of unloading system 40. Tempering section 36 is defined at its outward sides by the exterior surface of exterior walls 24. Tempering section 36 is defined at its outward ends by the exterior surface of end walls 52.

In the arrangement shown, as one example, grain columns 22 extend through tempering section 36 from its upper end to its lower end. In the arrangement shown, as one example, grain columns 22 of tempering section 36 vary in width from their upper end to their lower end. That is, the width of the grain column 22 at the upper end of tempering section 36 is wider than the width of the grain column 22 at the lower end of tempering section 36. This is because, due to the operational nature of the mixed-flow heating section 34, the grain columns 22 are wider in the mixed-flow heating section 34 as compared to the grain columns 22 of the cross-flow cooling section 38. This difference in the width of grain columns 22 between the mixed-flow heating section 34 and the cross-flow cooling section 38 causes the grain to remain in the grain column 22 of the mixed-flow heating section 34 longer than the grain remains in the grain column 22 of the cross-flow cooling section 38. Or, said another way, the grain moves through the narrower grain columns 22 of the cross-flow cooling section 38 faster than the grain moves through the wider grain columns 22 of the mixed-flow heating section 34. The speed at which the grain moves the grain columns 22 of the mixed-flow heating section 34 the cross-flow cooling section 38 is also varied by the height of these portions of the grain columns 22 as well as the speed at which the unloading system 40 operates. In this way, optimal operational performance may be achieved by varying the height of the various portions of the grain columns 22, the width of the various portions of the grain columns 22, the unload speed of the unloading system 40, as well as other features such as the temperature of the air blown into the heat plenum 62, the pressure applied by fan system 44 to both the cool plenum 64 and heat plenum 62, the size, shape, position, density and configuration of the inlet ducts 88 and exhaust ducts 90 and the size, shape, density and configuration of the perforations in the exterior wall 24 and interior wall 26 of cross-flow cooling section 38. the height of the sections of the grain columns 22 between the mixed-flow heating section 34 and the cross-flow cooling section 38 causes the grain to remain in the grain column 22 of the mixed-flow heating section 34 longer than the grain remains in the grain column 22 of the cross-flow cooling section 38.

In the arrangement shown, as one example, grain columns 22 of tempering section 36 are defined at their outward sides by the interior surface of exterior walls 24 and at their inward sides by the interior surface of interior walls 26. Similarly, grain columns 22 of tempering section 36 are defined at their outward ends by the interior surface end walls 52.

As mentioned, tempering section 36 narrows the width of grain column 22 as it extends downward from mixed-flow heating section 34 to cross-flow cooling section 38. In the arrangement shown, as one example, the exterior wall 24 of tempering section 36 extends slightly inward at an angle from its upper end (at the lower end 86 of mixed-flow heating section 34) to midpoint 102 positioned approximately two thirds of the way down the tempering section 36 and about one third of the way above the lower end 100 of tempering section 36. In the arrangement shown, as one example, the exterior wall 24 of tempering section 36 extends approximately vertically between midpoint 102 and the lower end 100 of tempering section 36. Similarly, In the arrangement shown, as one example, the interior wall 26 of tempering section 36 extends inward at an angle from its upper end (at the lower end 86 of mixed-flow heating section 34) to midpoint 102 positioned approximately two thirds of the way down the tempering section 36 and about one third of the way above the lower end 100 of tempering section 36. In the arrangement shown, as one example, the interior wall 26 of tempering section 36 extends approximately vertically between midpoint 102 and the lower end 100 of tempering section 36. In the arrangement shown, as one example, the angle of interior wall 26 is substantially greater than the angle of exterior wall 24. However, any other configuration of is hereby contemplated for use as tempering section 36.

In the arrangement shown, as one example, exterior wall 24 and interior wall 26 of tempering section 36 are solid from their upper end to their lower end. As such, air flow is prevented through exterior wall 24 and interior wall 26 of tempering section 36 which substantially reduces, prevents and/or wholly stops air flow through the grain column 22 in tempering section 36. This is important in that the tempering section 36 separates the mixed-flow heating section 34 from the cross-flow cooling section 38 and the mixed-flow heating section 34 operates by air being forced outward through the grain column 22 while the cross-flow cooling section 38 operates by air being pulled inward through the grain column 22. By having the exterior wall 24 and interior wall 26 of tempering section 36 be of requisite height as well as be solid, this reduces, prevents or stops the bleeding of air flow from one of the cross-flow cooling section 38 and the mixed-flow heating section 34 to the other of the cross-flow cooling section 38 and the mixed-flow heating section 34. In this way, the solid exterior wall 24 and interior wall 26 of tempering section 36 serves to separate the reverse air flows of mixed-flow heating section 34 from the cross-flow cooling section 38.

In the arrangement shown, as one example, the upper end of tempering section 36 approximately aligns with the plane formed by divider 60 which separates heat plenum 62 from cool plenum 64. The presence of divider 60 at the upper end of tempering section 36 further helps to limit the bleeding of air flow from one of the cross-flow cooling section 38 and the mixed-flow heating section 34 to the other of the cross-flow cooling section 38 and the mixed-flow heating section 34.

In the arrangement shown, as one example a baffle 104 is positioned within the grain column 22 of tempering section 36. Baffle 104 is formed of any suitable size, shape and design and is configured to help direct grain flow from the grain column 22 of mixed-flow heating section 34 to the grain column 22 of the cross-flow cooling section 38 in an even and consistent manner such that grain flows evenly across the width of the grain column 22 of mixed-flow heating section 34 so as to facilitate even heating and drying. In one arrangement baffle 104 is useful in evening the flow of grain from grain column 22 of mixed-flow heating section 34 due to the narrowing of the grain column 22 in tempering section 36 and/or the varying angles of exterior wall 24 and interior wall 26 of tempering section 36.

In the arrangement shown, as one example, a single baffle 104 is positioned in the grain column 22 of tempering section 36, however any number of baffles 104 are hereby contemplated for use such as none, two, three, four or more. In the arrangement shown, as one example, baffle 104 is a generally flat and straight planar member that extends the length of tempering section 36 from end wall 52 to end wall 52, however any other size shape and configuration is hereby contemplated for use. In the arrangement shown, as one example, the upper end of baffle 104 is positioned in approximate alignment with the upper end of tempering section 36 and the lower end of baffle 104 terminates in approximate alignment with the midpoint 102, which coincides with the grain column resuming vertically extending exterior walls 24 and interior walls 26. In this way, baffle 104 evenly transitions the flow of grain from the vertically extending straight exterior walls 24 and interior walls 26 of mixed-flow heating section 34 to the vertically extending straight exterior walls 24 and interior walls 26 of cross-flow cooling section 38. As baffle 104 is itself a solid member, baffle 104 also serves to reduce cross-flow air movement within grain column 22.

If it were not for divider and the solid exterior walls 24 and interior walls 26 of tempering section 36, the vacuum air pressure of cross-flow cooling section 38 would draw air in from the mixed-flow heating section 34. By separating cross-flow cooling section 38 from the mixed-flow heating section 34 by the length of the solid exterior walls 24 and interior walls 26 of tempering section 36 this reduces or prevents cross-contamination of air flow between cross-flow cooling section 38 and mixed-flow heating section 34.

The lower end 100 of tempering section 36 connects to the upper end of cross-flow cooling section 38.

In one arrangement, the width of grain column 22 in the mixed-flow heating section 34 is approximately thirty inches wide, whereas the width of the grain column 22 in the cross-flow cooling section 38 is approximately fourteen inches wide. As such, in this arrangement, as one example, the width of the grain column 22 in the cross-flow cooling section 38 is less than half the width of the grain column 22 in the mixed-flow heating section 34. Any other configuration or dimensions are hereby contemplated for use.

Cross-Flow Cooling Section:

In the arrangement shown, as one example, mixed-flow grain dryer with cross-flow vacuum cool heat recovery system 10 includes a cross-flow cooling section 38. Cross-flow cooling section 38 is formed of any suitable size, shape and design and is configured to facilitate cooling of grain in grain columns 22 as well as facilitating heat recovery to improve energy efficiency of the system 10.

In the arrangement shown, as one example cross-flow cooling section 38 extends vertically from its upper end, at the lower end 100 of tempering section 36, to its lower end 106, at the upper end of unloading system 40. Cross-flow cooling section 38 is defined at its outward sides by the exterior surface of exterior walls 24. Cross-flow cooling section 38 is defined at its outward ends by the exterior surface of end walls 52.

In the arrangement shown, as one example, grain columns 22 extend through cross-flow cooling section 38 from its upper end to its lower end 106. More specifically, in the arrangement shown, as one example, grain columns 22 of cross-flow cooling section 38 have a generally consistent width and shape from the lower end 100 of tempering section 36 to a transition point 108 midway between the upper end of cross-flow cooling section 38 and the lower end 106 cross-flow cooling section 38. That is, grain columns 22 of cross-flow cooling section 38 are defined at their outward sides by the interior surface of exterior walls 24 and at their inward sides by the interior surface of interior walls 26, wherein exterior walls 24 and interior walls 26 extend in approximate parallel spaced relationship to one another from upper end of cross-flow cooling section 38 to lower end 106 of cross-flow cooling section 38. Similarly, grain columns 22 of cross-flow cooling section 38 are defined at their outward ends by the interior surface end walls 52. In this way, grain columns 22 of cross-flow cooling section 38 above transition point 108 are generally square or rectangular in shape and extend vertically.

In the arrangement shown, as one example, at transition point 108, grain columns 22 transition from vertical extension to an angled inward extension toward the generally centrally positioned unloading system 40. More specifically, the exterior walls 24 and interior walls 26 angle inward at transition point 108. Notably, the width of grain columns 22 remain constant above and below transition point 108 and the transition point 108 in interior wall 26 is positioned slightly above the transition point 108 in exterior wall 24, so as to maintain a consistent width of grain column 22 above and below transition point 108.

In the arrangement shown, as one example, exterior wall 24 and interior wall 26 of cross-flow cooling section 38 facilitate airflow through the grain columns 22. In one arrangement, exterior wall 24 and interior wall 26 of cross-flow cooling section 38 are formed of perforated sheets of material, however any other configuration of a barrier that prevents the passage of grain there through while allowing for air flow there through is hereby contemplated for use.

The lower end 106 of cross-flow cooling section 38 connects to and feeds grain to the upper end of unloading system 40.

In use, air handling system 42 is fluidly connected to the hollow interior of cool plenum 64. Air handling system 42 applies a vacuum to cool plenum 64 thereby sucking or pulling air out of cool plenum 64. This vacuum applied to cool plenum 64 causes air to be drawn through the air-permeable exterior wall 24 of cross-flow cooling section 38, the air is then drawn through the grain in the grain column 22 of cross-flow cooling section 38, the air is then drawn through the air-permeable interior wall 26 and into the cool plenum 64. Air handling system 42, using fan system 44 then pulls air out of the cool plenum 64 and blows it under pressure into heat plenum 62 along with heat added by heating system 46.

As ambient air is drawn through the heated grain in grain column 22 of cross-flow cooling section 38, the ambient air cools the grain and is itself warmed. This air flow also helps to carry away moisture from the heated grain thereby further drying the grain. The result is that the air that is fed into the air handling system 42 is warmed thereby harnessing the principles of heat conservation, and recycling heat. This means that the air that is blown into the heat plenum 62 must be warmed to a lesser degree than it would otherwise be if ambient air was used. As the air blown into heat plenum 62 needs to be heated to a lesser degree to achieve the desired temperature due to the conservation of heat and recycling of heat, lets energy is used to dry the grain. Another benefit is that the temperature of the grain that is discharged from the cross-flow cooling section 38 is cooler than it would otherwise be if it were not passed through the cross-flow cooling section 38. Cooling the grain before it is stored improves the stability of the grain in long term storage and requires less handling precautions.

Another substantial benefit of the cross-flow cooling section 38 is that angles inward at its lower end thereby facilitating unloading of the grain at a single unload point, which is unloading system 40.

Unloading System:

In the arrangement shown, as one example, mixed-flow grain dryer with cross-flow vacuum cool heat recovery system 10 includes an unloading system 40. Unloading system 40 is formed of any suitable size, shape and design and is configured to facilitate unloading of dry grain from system 10.

Any form of a grain unloading system is hereby contemplated for use as unloading system 40. In the arrangement shown, as one example, unloading system 40 is an auger system that receives grain from the ends of each grain column 22. A shaft 70 with flighting 71 extends across the lower end of system 10. The shaft 70 with flighting 71 is connected to a motor 72 (not shown) by a pulley and belt system (also not shown) and is configured to rotate the shaft 70 with flighting 71. Unloading system 40 facilitates the discharge of grain at a single discharge point 110.

In the arrangement shown, as one example, the exterior walls 24 angle inward from the lower end 106 of cross-flow cooling section 38 to the point where they connect to one another just below the center of unloading system 40, or more specifically the center of shaft 70 with flighting 71. Similarly, in the arrangement shown, as one example, the interior walls 26 angle inward from the lower end 106 of cross-flow cooling section 38 to the point where they connect to one another just above the center of unloading system 40, or more specifically the center of shaft 70 with flighting 71. In this way, the adjacent grain columns 22 converge with one another at unloading system 40.

In the arrangement shown, as one example, a baffle 112 is positioned in grain column 22 a distance upstream of shaft 70 with flighting 71. Baffle 112 is connected at its upward end to the interior surface of interior wall 26 and angles downward therefrom, across grain column 22, before terminating at a free end adjacent metering roll 114. Baffle 112 serves to direct grain from grain column 22 to metering roll 114 in such a way that the grain is evenly removed from grain column 22.

Metering roll 114 is formed of any suitable size, shape and design and is configured to control the speed at which grain is metered out of the lower end of grain column 22 and into the unloading system 40 for discharge out of the system 10. In the arrangement shown, as one example, metering rolls 114 include a shaft 116 having flights 118. As the metering rolls 114 rotate, a quantity of grain is discharged to be unloaded. As such, the faster the metering rolls 114 rotate the faster the grain is discharged. The faster the metering rolls 114 rotate, the faster the grain moves through grain columns 22. In the arrangement shown, baffles 112 and metering rolls 114 extend the forward to back length of system 10 from front end wall 52 to rear end wall 52.

In the arrangement shown, as one example, a single baffle 112 and a single metering roll 114 is shown the grain column 22 on each side of unloading system 40. However, it is hereby contemplated for use to use two or more baffles and/or metering rolls 114, which can provide operational advantages, such as independent control and increased discharge rates, among other advantages.

In operation, when grain in grain columns 22 reach the unloading system 40 the grain is directed by baffle 112 towards metering roll 114. The shape, position and configuration of baffle 112 serves to ensure that grain is evenly moved from grain column 22. As metering roll 114 rotates, as each flight 118 rotates, an amount of grain is moved passed baffle 112 and metering roll 114. This grain, slides under the force of gravity along the interior lower surface of exterior wall 24 until it reaches the shaft 70 with flighting 71. As the shaft 70 with flighting 71 rotates, the grain is moved along the length of system 10 to a discharge point 110 at which point the grain exits system 10.

While in the arrangement shown, only a single auger, or shaft 70 with flighting 71 is used, it is hereby contemplated that multiple augers or multiple shafts 70 with flighting 71 are used in unloading system 40. Alternatively, a belt, a conveyor, a paddle sweep and/or a drag chain system is hereby contemplated for use as unloading system 40. Any other structure or configuration of a system for loading grain is hereby contemplated for use as unloading system 40.

Air Handling System:

In the arrangement shown, as one example, mixed-flow grain dryer with cross-flow vacuum cool heat recovery system 10 includes an air handling system 42. Air handling system 42 is formed of any suitable size, shape and design and is configured to facilitate air flow through the system 10 using fan system 44 as well as facilitating heating of that air flow using heating system 46.

In the arrangement shown, as one example, air handling system 42 is connected to the forward end wall 52 of system 10. More specifically, air handling system 42 is connected to both the cool plenum 64 as well as the heat plenum 62.

In the arrangement shown, as one example, air handling system 42 includes a fan system 44. Fan system 44 is formed of any suitable size shape and design and is configured to provide air flow through the system 10. Fan system 44 may be formed of a single fan, or a plurality of fans or any other device that facilitates air flow.

In the arrangement shown, fan system 44 is fluidly connected to cool plenum 64 at its input end. In this way, when in operation, fan system 44 applies a vacuum to cool plenum 64 which has the effect of pulling or drawing air into the cool plenum 64 through the air permeable exterior wall 24 of cross-flow cooling section 38, through the grain held in the grain column 22 of cross-flow cooling section 38, and through the interior wall 26 of cross-flow cooling section 38 and into cool plenum 64.

In the arrangement shown, fan system 44 is fluidly connected to heat plenum 62 at its output end. In this way, when in operation, fan system 44 applies pressurized air flow to heat plenum 62 which has the effect of forcing air into heat plenum 62, through the open interior ends of inlet ducts 88, out the open lower ends of inlet ducts 88 and into the grain column 22, through the grain column 22, into the open lower ends of exhaust ducts 90, and out the open exterior end of the exhaust ducts 90 where it is vented to the environment.

In the arrangement shown, as one example, air handling system 42 includes a heating system 46. Heating system 46 is formed of any suitable size shape and design and is configured to provide heat to heat the air flow through the system 10. In one configuration, heating system 42 is placed at the output end of fan system 44 and is formed of one or more burners. When in operation, heating system 46 heats the air flow that is blown into heat plenum 62 of mixed-flow heating section 34.

In the arrangement shown, as one example, air handling system 42 includes louvers 48. Louvers 48 are formed of any suitable size, shape and design and are configured to control the amount of air that is pulled through cool plenum 64 as compared to the amount of air that is pulled from the surrounding environment. As louvers 48 are closed, more air is drawn through the cool plenum 64, which means more air is drawn through the grain in grain column 22 of the cross-flow cooling section 38 thereby cooling the grain to a greater amount and recycling more heat. As louvers 48 are opened, more air is drawn from the surrounding environment, which means less air is drawn through the grain in grain column 22 of the cross-flow cooling section 38 thereby cooling the grain to a lesser amount and recycling less heat.

In the arrangement shown, as one example, air handling system 42 is fluidly connected to the end wall 52 by a duct system 120 that forms an air passage way from cool plenum 64 to the input end of air handling system 42 as well as forms an air passage way from the output end of air handling system 42 to the heat plenum 62. Through the air passage ways formed by duct system 120 air is passed from cool plenum 64 to air handling system 42 to heat plenum 62.

Also, in the arrangement shown, air handling system 42 has a housing 122 that surrounds the exterior of air handling system 42. This housing 122 serves to prevent and/or control the air flow into and out of the air handling system 42. In the arrangement shown, as one example, louvers 48 selectively cover openings in this housing 122.

Support System:

In the arrangement shown, as one example, mixed-flow grain dryer with cross-flow vacuum cool heat recovery system 10 includes a support system 50. Support system 50 is formed of any suitable size, shape and design and is configured to provide strength and rigid support for mixed-flow grain dryer with cross-flow vacuum cool heat recovery system 10.

In the arrangement shown, as one example, mixed-flow grain dryer with cross-flow vacuum cool heat recovery system 10 has a single point unloading system 40. This provides many advantages as the grain is unloaded at a single point by a single mechanical device (unloading system 40) which reduces mechanical complexity of the system 10 in some ways and eliminates moving parts. While having a single point unload provides some benefits, it also provides some challenges. Namely, due to the inwardly angling exterior walls 24 that connect to unloading system 40, the lower end of system 10 is not well suited to sit upon the ground or a platform. Instead, due to the configuration of the lower end of the system 10, a support system 50 is needed to raise the lower end of the system 10 above the ground or platform upon which it rests and/or provide additional stability to the system 10.

In the arrangement shown, as one example, support system 50 is formed of a plurality of horizontal supports 124 and a plurality of vertical supports 126. Horizontal supports 124 and vertical supports 126 are formed of any suitable size, shape and design and extend between and connect to the platform upon which system 10 sits and/or structural components of the system and/or horizontal supports 124 and vertical supports 126 connect to one another. In the arrangement shown, as one example the plurality of horizontal supports 124 and plurality of vertical supports 126 raise the main body of system 10 above the ground or platform that system sits upon as well as provides a strong and stable base for system 10.

In Operation:

In operation, wet grain is supplied to the input 68 of loading system 30. The as the motor 72 operates this causes the shaft 70 with flighting 71 to rotate which causes the grain to evenly move across the upper end of the wet hold section 32. When the wet grain is added to the wet hold section 32 the grain travels down under the force of gravity between exterior wall 24 and interior wall 26. The grain is separated into a pair of grain columns 22 which exist on each side of a plenum 28. As the grain exits the lower end of the wet hold section 32 the grain enters the upper end of the mixed-flow heating section 34.

As the grain travels down the mixed-flow heating section 34 the grain travels downward within the grain column 22 between the exterior wall 24 and interior wall 26 and between end walls 52. As the grain travels downward within the grain column 22 of mixed-flow heating section 34 the grain encounters the triangular shaped inlet ducts 88 and exhaust ducts 90 that extend across the grain columns 22. As the grain encounters the triangular shaped inlet ducts 88 and exhaust ducts 90 the grain is directed to one side or the other due to the triangular shaped inlet ducts 88 and exhaust ducts 90. It is important to note that due to the off-set position of vertically adjacent inlet ducts 88 and exhaust ducts 90, the grain is moved laterally within the grain column 22. This lateral movement, as the grain moves vertically, has a mixing effect on the grain, which facilitates gentle and even heating of the grain.

As the grain passes through the grain column 22 of the mixed-flow heating section 34, heated air is blown by the air handling system 42 into the heat plenum 62. This heated pressurized air flow to heat plenum 62 is forced through the open interior ends of inlet ducts 88 that connect with interior wall 26. This heated pressurized air flow is then forced along the length of inlet ducts 88 until it passes out the open lower end of inlet ducts 88 and into the grain of grain column 22. This heated pressurized air flow passes through the grain in the grain column 22 thereby heating and drying the grain. This heated pressurized air flow finds its way into the open lower end of exhaust ducts 90. This heated pressurized air is then forced along the length of exhaust ducts 90 until it passes out the open exterior end of exhaust ducts 90 at which point it is vented to the atmosphere.

As the grain travels downward and passes the lower end of mixed-flow heating section 34 the grain enters the tempering section 36. As the grain enters the tempering section 36 the grain engages the inward angling exterior wall 24 and interior wall 26 which narrows the width of the grain column 22 from the wider mixed-flow heating section 34 to the narrower cross-flow cooling section 38. In this transition, the grain engages baffle 104 which ensures the grain is evenly removed from the mixed-flow heating section 34. Due to the interior wall 26 and exterior wall 24 of tempering section 36 being solid and air impermeable, little or no air flows through the grain in grain column of tempering section 36.

As the grain travels downward and passes the lower end of tempering section 36 the grain enters the cross-flow cooling section 38. As the grain travels down the grain column in the cross-flow cooling section 38 air is pulled through the air permeable exterior wall 24, through the grain in the grain column 22 thereby cooling and further drying the grain, and through the air permeable interior wall 26, and into the cool plenum 64. This warmed air is then recycled by air handling system 42 up to the heat plenum 62 of the mixed-flow heating section 34 with supplemental heat added by heating system 46 and so the cycle is repeated.

As the grain exits the lower end of the cross-flow cooling section 38 the grain enters the unloading system 40. As the grain travels down the grain column 22 of the unloading system 40 the grain engages and is directed by the baffle 112 toward metering roll 114. As the metering roll 114 rotates grain is dispensed to the auger system having a shaft 70 and flighting 71. As the shaft 70 with flighting 71 rotates the grain is moved along the length of the system 10 until it passes out the discharge point 110.

In this way, grain is heated and dried in an efficient and gentle manner using mixed-flow heating section 34, tempering section 36 and cross-flow cooling section 38 of mixed-flow grain dryer with cross-flow vacuum cool heat recovery system 10.

Central Controller:

In the arrangement shown, as one example, mixed-flow grain dryer with cross-flow vacuum cool heat recovery system 10 includes a central controller that controls operation of the mixed-flow grain dryer with cross-flow vacuum cool heat recovery system 10, or more specifically controls operation of the loading system 30, the unloading system 40, the air handling system 42 including fan system 44, heating system 46 and louvers 48, and any other electrical and/or controllable component of the system 10.

Second Mixed-Flow Heating Section:

In one arrangement, a second mixed-flow heating section 34 with its own air handling system 42 is positioned on top of the first mixed-flow heating section 34. In this arrangement, the heat plenum 62 of the first mixed-flow heating section 34 and the heat plenum 62 of the second mixed-flow heating section 34 are separated by a divider 60. For all intents and purposes the second mixed-flow heating section 34 and air handling system 42 operate similarly if not identically to the first mixed-flow heating section 34 and air handling system 42 described herein with the biggest difference being that there is no heat recovery associated with the second air handling system 42. That is, the second air handling system 42 simply blows heated air into the heat plenum 62 of the second mixed-flow heating section 34. The addition of a second mixed-flow heating section 34 increases capacity of the system 10.

It is hereby contemplated that any number of additional mixed-flow heating sections 34 with their own air handling systems 42 may be stacked onto the system 10 presented herein to add capacity to the system 10 such as two, three, four, five, six or more additional mixed-flow heating sections 34 with their own air handling systems 42.

Bridge Reducing Mixed Flow Grain Dryer Arrangement:

Overview: Mixed flow grain dryers, such as the mixed flow grain dryer system depicted as reference numeral 10 herein, have many benefits. One substantial benefit of mixed flow grain dryer system 10 is that due to the manner in which heated air flows from the heat plenum 62, through the interior wall 26 through the open interior end of the inlet ducts 88, out of the open bottom end of the inlet ducts 88, through the grain in the grain column 22, and into the open bottom end of the exhaust ducts 90 and out the exterior wall 24 through the open exterior end of the exhaust ducts 90, this process is very gentle on the grain. Another substantial benefit of mixed flow grain dryer system 10 is that due to the offset nature of the plurality of inlet ducts 88 and exhaust ducts 90 that extend across the grain column 22, as the grain moves vertically downward through the grain column 22 the grain encounters and moves around the plurality of inlet ducts 88 and exhaust ducts 90 which causes mixing of the grain thereby causing even heating and drying.

While mixed flow grain dryers (e.g., system 10) have many benefits, it has been observed that mixed flow grain dryers 10 may suffer from plugging or bridging in some situations. Plugging is a serious problem because plugged grain reduces the throughput of the grain dryer 10. Plugging is also a serious problem because the plugged grain can get overly dried and once dried can catch fire thereby causing damage to the grain dryer 10.

Figure 19:
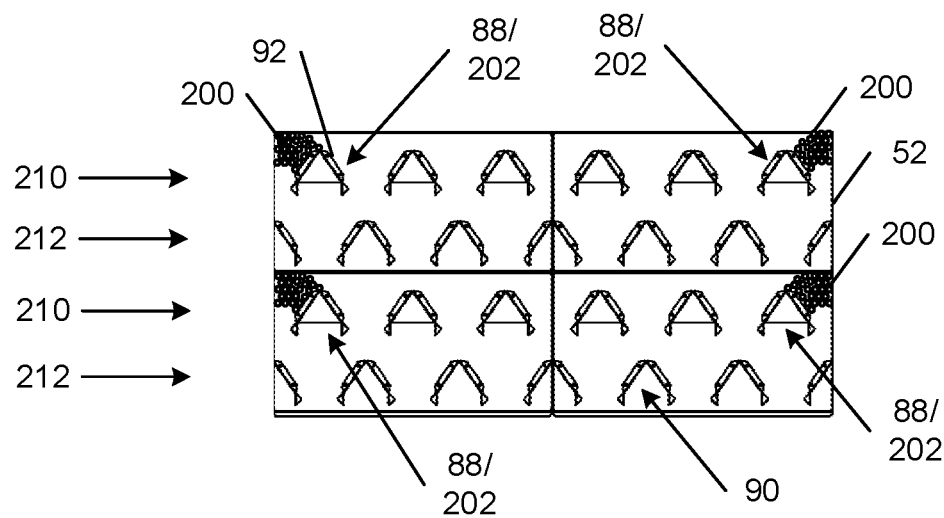
FIG. 19 is a view of the interior of a grain column of a mixed flor grain dryer; the view showing inlet and exhaust duct with bridged grain stuck between the outer most ducts and the end walls of the grain column.
Figure 20:
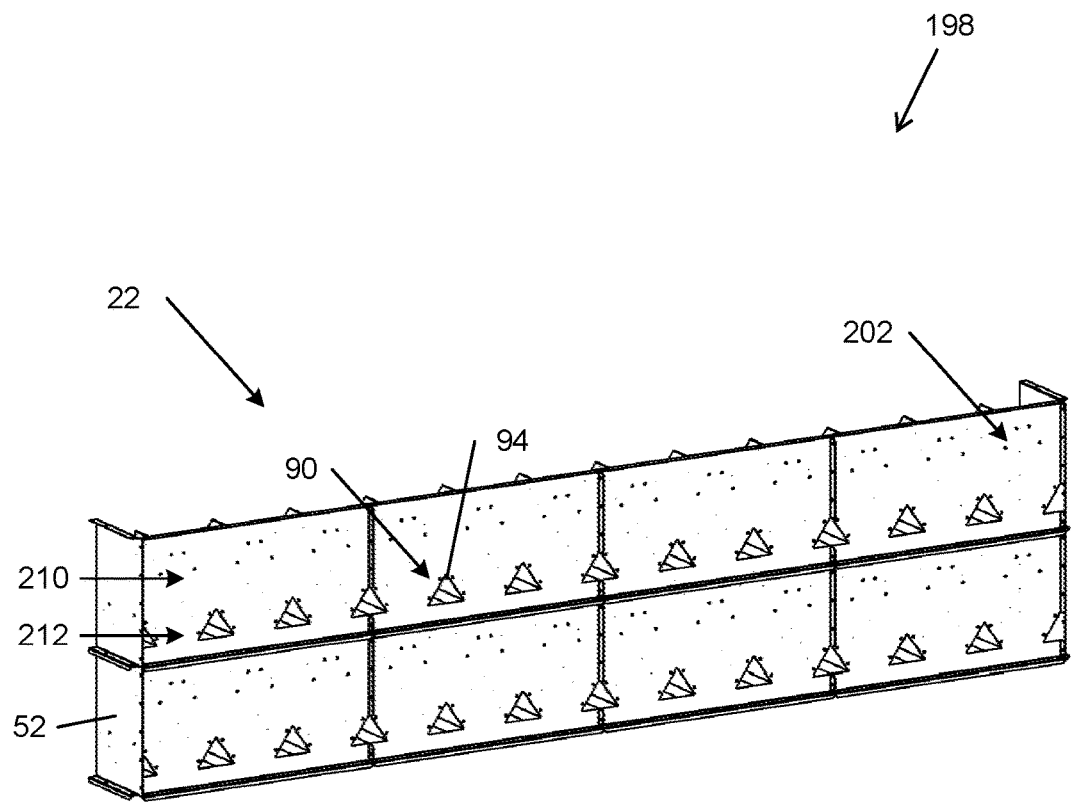
FIG. 20 is an exterior upper left perspective view of grain column of a mixed flor grain dryer; the view showing inlet and exhaust ducts and the exterior wall.
Figure 21:
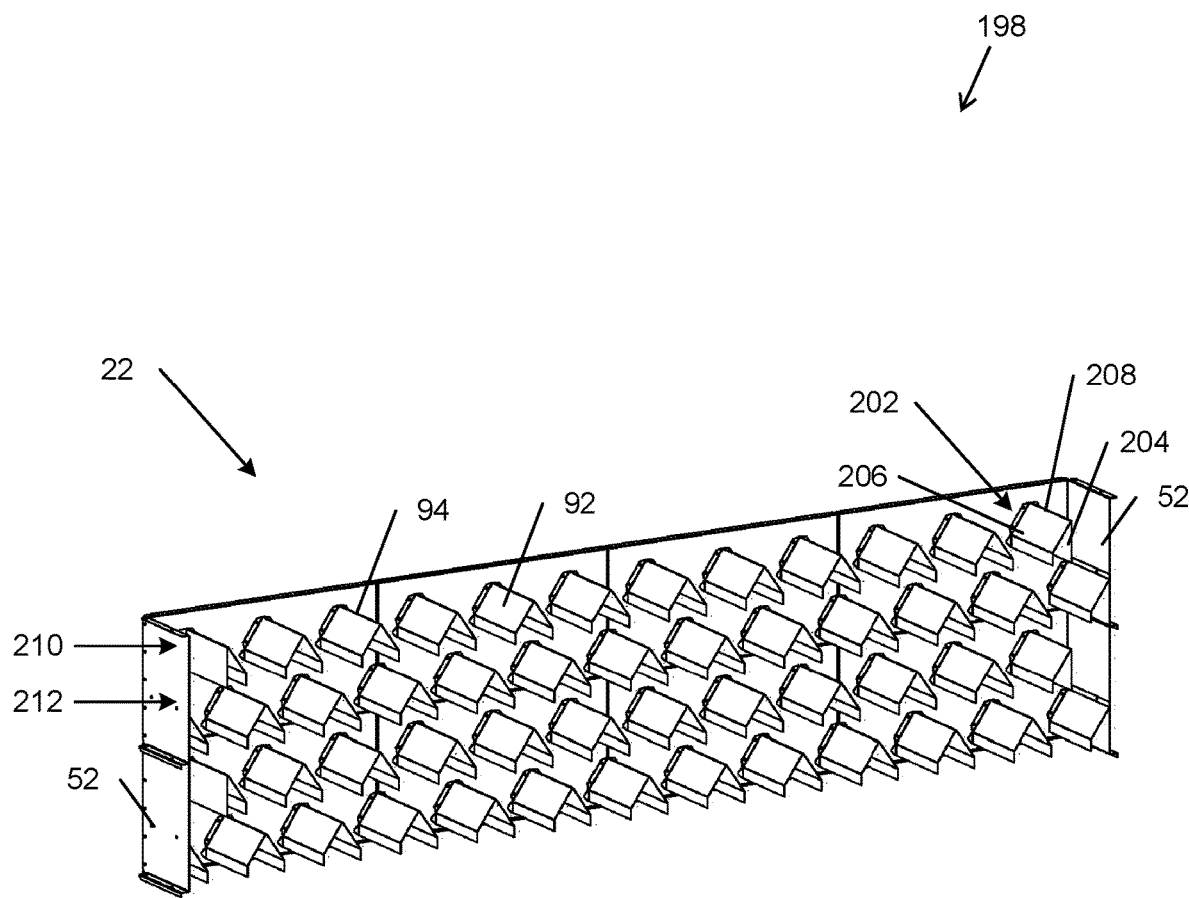
FIG. 21 is an interior upper right perspective view of grain column of a mixed flor grain dryer; the view showing inlet and exhaust ducts and the exterior wall.
Figure 22:
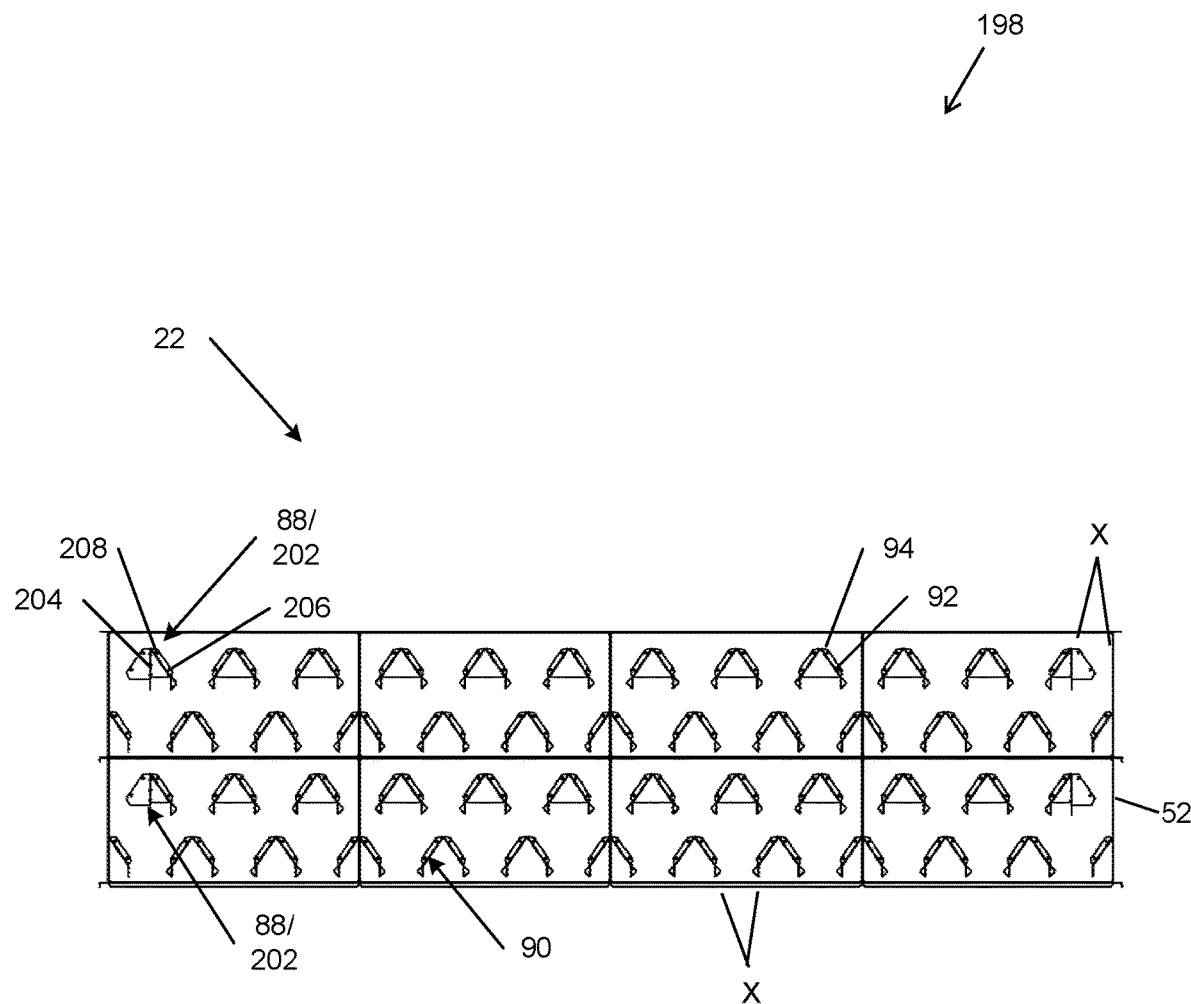
FIG. 22 is an interior rear view of grain column of a mixed flor grain dryer; the view showing inlet and exhaust ducts and the exterior wall.
Figure 23:
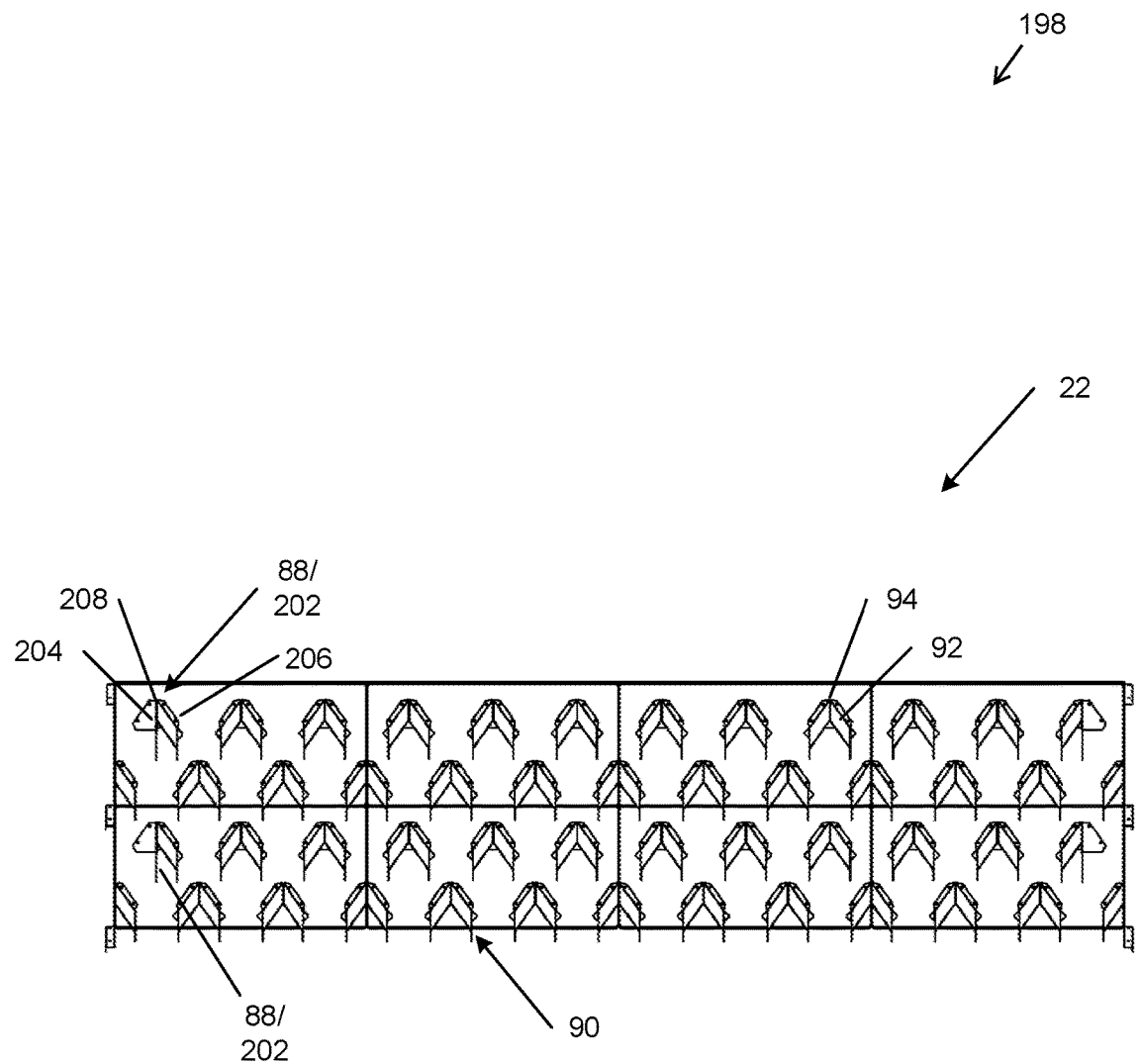
FIG. 23 is an interior rear upper perspective view of grain column of a mixed flor grain dryer; the view showing inlet and exhaust ducts and the exterior wall.
Figure 24:
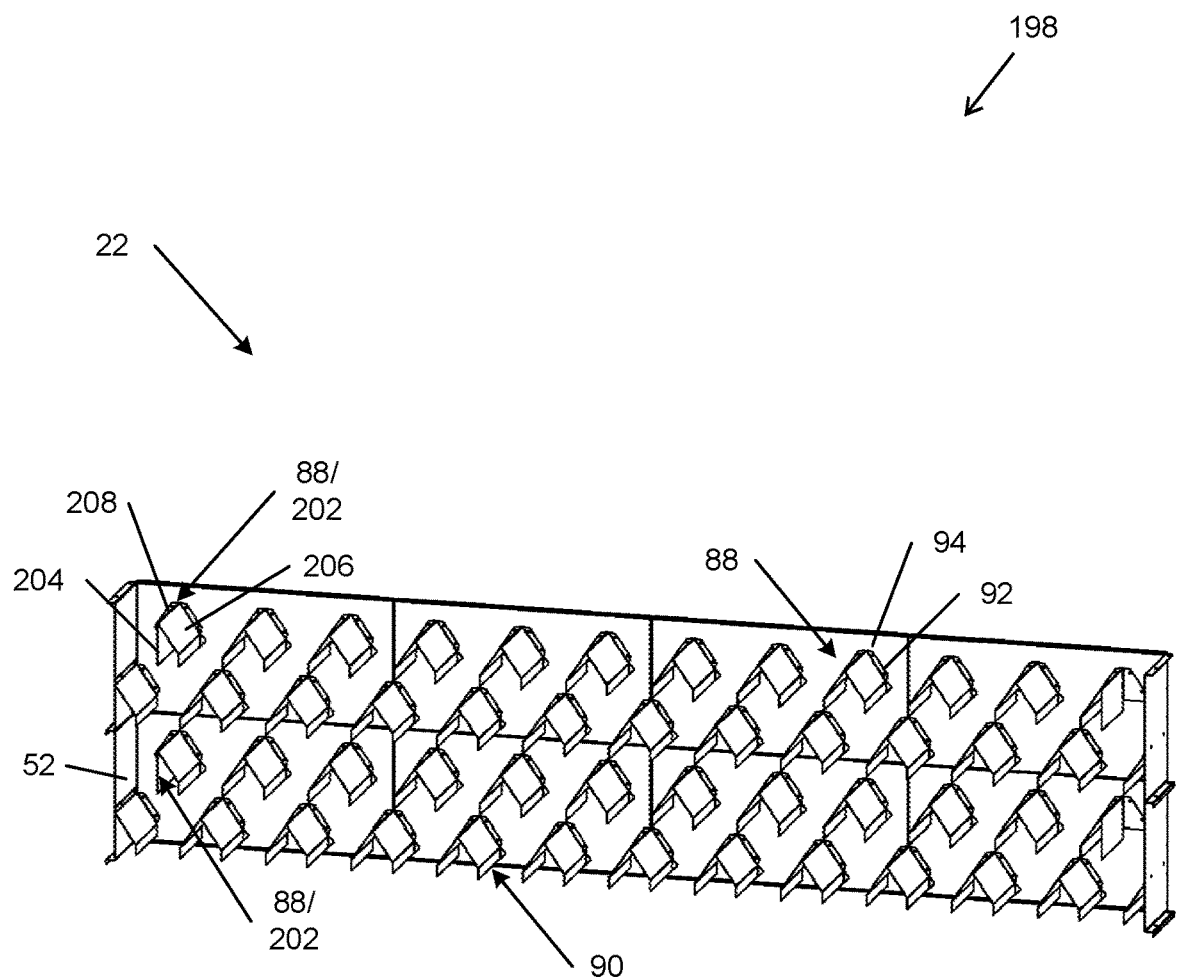
FIG. 24 is an exterior upper right perspective view of grain column of a mixed flor grain dryer; the view showing inlet and exhaust ducts and the exterior wall.
Figure 25:
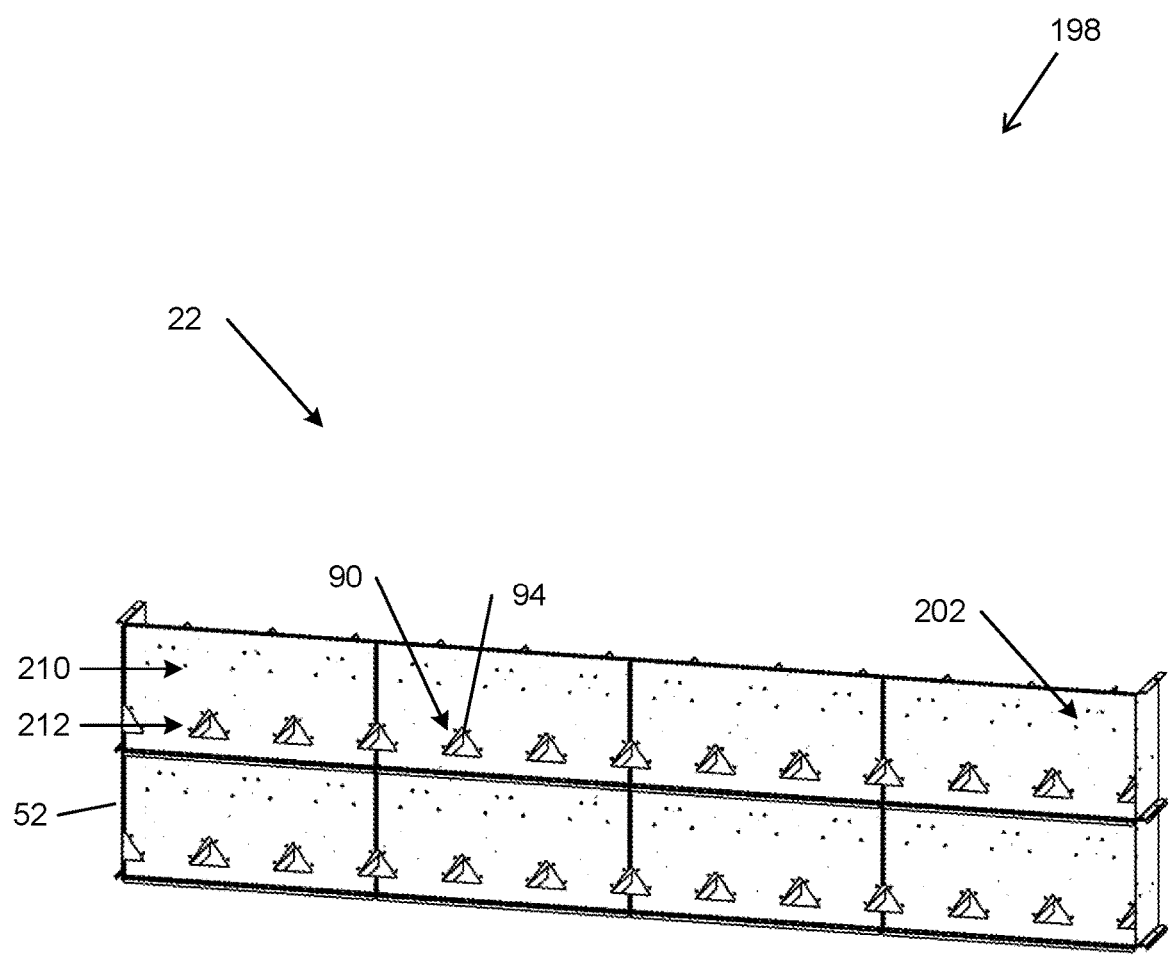
FIG. 25 is an interior upper left perspective view of grain column of a mixed flor grain dryer; the view showing inlet and exhaust ducts and the exterior wall.

It has been discovered that, in some instances, mixed flow grain dryer system 10 suffer from bridging of grain or grain clumps between end walls 52 and the outward-most positioned inlet ducts 88 and/or exhaust ducts 90. An example of this arrangement is depicted in FIG. 19. In FIG. 19 bridged grain 200 is captured between the outward facing angled outer wall 92 of outer most ducts 202 and the vertically extending interior surface of end wall 52. That is, in this arrangement, bridged grain 200 clumps up and gets caught between the outwardly extending and downwardly angled wall 92 of the outward-most inlet ducts 88 and/or exhaust ducts 90 and the vertically extending interior surface of end wall 52. This is because, in this area the grain is funneled through an ever-narrowing space between ducts 88, 90 and end wall 52. In contrast, in the arrangement shown, as one example, the distance between the lower end of all of the other inlet ducts 88 and/or exhaust ducts 90 is approximately twice the distance between the lower end of the outward-most-positioned inlet duct 88 and/or exhaust duct 90 and end wall 52.

Bridged grain 200 can occur for any number of reasons such as grain clumps, particularly moist grain, sticky grain, dirty grain, large grain, roughness on the walls 92 of ducts 88, 90, roughness on the end wall 52, foreign objects in the grain, or any combination of these factors, among countless other reasons. When bridged grain 200 occurs, this stops the flow of grain at the outward sides of mixed flow grain dryer 10. When bridged grain 200 occurs, this can require manual removal of the bridged grain 200 or other maintenance to remove the bridged grain 200 and/or prevent bridged grain 200 from occurring again. In some instances, when bridging occurs, the bridged grain is heated longer than intended and may catch fire, which can damage or destroy the grain dryer 10 and/or cause injury or death, loss of drying capacity, loss of grain, among other problems.

Mixed Flow Grain Dryer System 194:

With reference to FIGS. 20-25, an alternative mixed flow grain dryer system 194 arrangement is presented that prevents grain from bridging. This alternative arrangement presented in FIGS. 20-25 is similar to the mixed flow grain dryer system 10 presented in FIGS. 1-19 and therefore unless specifically stated otherwise herein, the prior teaching and disclosure shown in FIGS. 1-19 applies equally to the alternative arrangement shown in FIGS. 20-25. That is, the arrangement shown in FIGS. 20-25 is configured to be used with the same or similar pair of grain columns 22 having exterior wall 24, interior wall 26, and plenum 28; loading system 30; wet hold section 32; mixed-flow heating section 34; tempering section 36; cross-flow cooling section 38; unloading system 40; air handling system 42 having a fan system 44, a heating system 46 and louvers 48; and a support system 50, among other components, with the different being changes to outer most ducts 202 of inlet ducts 88 and/or exhaust ducts 90 as is described herein. Notably, the arrangement shown in FIGS. 20-25 may be used with any mixed flow grain dryer, and not just a mixed flow grain dryer with vacuum cool as is shown in FIGS. 1-18.

Outer Most Ducts 202

In one or more arrangements, outer most ducts 202 of mixed flow grain dryer system 194 are configured to reduce the bridging of grain between end walls 52 and the outer most ducts 202. Outer most ducts 202 are formed of any suitable size, shape and design and are configured to allow the flow of heated air through the grain in grain column 22 of heating section 34 so as to facilitate gentle heating and drying of the grain while also inhibiting bridging of grain between end walls 52 and the outer most ducts 202. In the arrangement shown, as one example, outer most ducts 202 have an elongated shape extending from a first end at the exterior wall 24 of grain column 22 to a second end at interior wall 26 of grain column 22. That is, outer most ducts 202, like all other inlet ducts 88 and exhaust ducts 90 extend across the grain column and connect to interior wall 26 and exterior wall 24.

In this example arrangement, when viewed from the end, outer most ducts 202 are generally triangular shaped members having an outer wall 204 and an inner wall 206, which are jointed together at a peak 208. In this example arrangement, inner wall 206 extends outward and downward from the peak 208 at an angle away from end wall 52, similar to walls 92 of the other inlet ducts 88 and exhaust ducts 90.

In the arrangement shown, as one example, outer most ducts 202 are formed of what are known as right-triangles when viewed from an end. That is, the outer wall 204 extends in a generally vertical manner and extends in an approximate perpendicular alignment to the open bottom end of the outer most duct 202, thereby forming an approximate 90° angle or right-angle between the outer wall 204 and the open bottom wall of the outer most duct 202, which gives the right triangle its name. The inner wall 206 then serves as the hypotenuse of the right triangle connecting to the upper end of outer wall 204 at peak 208 and connecting at its lower the open bottom end. Any other configuration or design is hereby contemplated for use for outer most duct 202.

In this example arrangement, outer walls 204 of outer most ducts 202 extend in a generally vertical downward fashion from peak 208. That is, this outward most duct 202 includes an outer wall 204 that extends in approximate parallel spaced relation to the interior facing side of end wall 52 that defines the end of grain column 22 between interior wall 26 and exterior wall 24. In this way, the use of outward most duct 202 does not form a narrowing area, or pinch-point, between the outward most duct 202 and the interior facing surface of end wall 52 of grain column 22. In this way, grain does not have an opportunity to compact or clump up and form bridged grain 200. As such, in this way, bridge reducing mixed flow grain dryer 198 provides an improved mixed flow grain dryer that is not susceptible of getting plugged by bridged grain 200 between the outward most duct 202 and end wall 52.

In the example arrangement shown, ducts 88/90 in rows 210/212 are equally spaced from each other by a distance X across grain column 22. In this example, arrangement, the vertical orientation of outer wall 204 of outward most duct 202 permits outward most duct 202 to also be separated from end wall 52 of grain column 22 by distance X, thereby preventing bridging of grain. (In contrast, the distance between the outer lower end of outer wall 204 of outward most duct 202 in FIG. 19 is ½ *X). In this way, the use of outward most ducts 202 with vertical or truncated outer walls 204 are no more restrictive than the other inlet ducts 88 and exhaust ducts at any other part of the mixed flow grain dryer system 10.

However, embodiments are not so limited. Rather, it is contemplated that ducts 88/90 in rows 210/212 may be separated from each other greater or lesser distances which may be uniform or non-uniform. Furthermore, it is contemplated that outer most ducts 202 may be separated from end walls 52 of grain columns 22 by greater or lesser distances which may be different from the distance separating ducts 88/90 in rows 210/212.

Although the arrangements are primarily shown and described with reference to bridge reducing mixed flow grain dryer 198 having an outward most duct 202 with a vertical extending outer wall 204, embodiments are not so limited. Rather, it is contemplated that in some various arrangements, outer wall 204 of outward most duct 202 may be oriented at various slopes or any slope configured to prevent grain from bridging between outer wall 204 and end wall 52 of grain column 22. For example, in some arrangements, outward most duct 202 has an inner wall 206 having a first slope (e.g., that is approximately the same as the slope of walls 92 of other ducts 88/90) and an outer wall 204 having a second slope that is greater than the first slope. The increased second slope of outer wall 204 helps to inhibit bridging of grain.

In the arrangement shown, as one example, inlet ducts 88 and exhaust ducts 90 are arranged in alternating horizontal rows of inlet ducts 210 and horizontal rows of exhaust ducts 212. In this example arrangement, due to the particular spacing and dimensions, all outward most ducts 202 happen to be in the rows of inlet ducts 210. However, embodiments are not so limited. Rather, it is contemplated that, in various arrangements, the outer most ducts 202 may be configured to operate as inlet ducts 88, as exhaust ducts 90, or with some outer most ducts 202 operating as inlet ducts 88 and others operating as exhaust ducts 90.

Furthermore, it is contemplated that, in various embodiments, inlet ducts 88 and exhaust ducts 90 may be positioned in any arrangement along interior wall 26 and exterior wall 24. For instance, as one alternative example, inlet ducts 88 and exhaust ducts 90 may be arranged in alternating columns of inlet ducts 88 and columns of exhaust ducts 90.

From the above discussion it will be appreciated that the mixed-flow grain dryer with cross-flow heat recovery system presented herein improves upon the state of the art. More specifically, and without limitation, it will be appreciated that the mixed-flow grain dryer with cross-flow heat recovery system presented herein: is efficient to use; facilitates heat recovery; reduces fuel consumption; is gentle on grain; does not damage grain when drying; does not overly dry grain; facilitates cooling of grain before it is discharged; evenly dries grain; does not have variability of grain quality across the grain column; does not have variability of moisture across the grain column; can be precisely controlled; that provides optimum results; that facilitates unloading of grain from the dryer at a single point; is relatively compact; is relatively inexpensive; can be used with all kinds of grain; that minimizes maintenance; requires less cleaning; is cleaner to use than prior art systems; is safe to use; reduces the potential for a fire; requires less air pressure; requires less air flow; provides improved grain quality; is easy to use; has a robust design; is high quality; incorporates the benefits of mixed-flow grain dying with the benefits of cross-flow vacuum cooling; and/or reduces bridging of grain among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:
1. A grain dryer system, comprising:
a loading system;
a pair of grain columns;
the loading system configured to load wet grain into the pair of grain columns;

the pair of grain columns having a mixed-flow heating section;
the pair of grain columns having a cooling section;
wherein the pair of grain columns have respective lower sections configured to direct dry grain to a single unload point for unloading;
an unloading system;
the unloading system configured to receive and unload the dry grain from the grain dryer system via the single unload point.

2. A grain dryer system, comprising:
a loading system;
a pair of grain columns;
the loading system configured to load wet grain into the pair of grain columns;
the pair of grain columns having a mixed-flow heating section;
the pair of grain columns having a cooling section;
wherein the pair of grain columns have respective lower sections configured to direct dry grain to a single unload point for unloading;
wherein the lower sections of the pair of grain columns each include a respective metering device configured to control a speed at which grain flows from the lower section to an unloading system;
the unloading system configured to receive and unload the dry grain from the grain dryer system via the single unload point.

3. A grain dryer system comprising:
a loading system;
a pair of grain columns;
the loading system configured to load wet grain into the pair of grain columns;
the pair of grain columns having a mixed-flow heating section;
the pair of grain columns having a cooling section;
wherein the pair of grain columns have respective lower sections configured to direct dry grain to a single unload point for unloading;
wherein the lower sections of the pair of grain columns each include a respective metering roll configured to control a speed at which grain is metered from the lower section to an unloading system;
the unloading system configured to receive and unload the dry grain from the grain dryer system via the single unload point.

4. A grain dryer system comprising:
a loading system;
a pair of grain columns;
the loading system configured to load wet grain into the pair of grain columns;
the pair of grain columns having a mixed-flow heating section;
the pair of grain columns having a cooling section;
wherein the pair of grain columns have respective lower sections configured to direct dry grain to a single unload point for unloading;
wherein a first one of the lower sections of the pair of grain columns includes a first metering device configured to control a first speed at which grain flows from the first one of the lower sections to an unloading system;
wherein a second one of the lower sections of the pair of grain columns includes a second metering device configured to control a second speed at which grain flows from the second one of the lower sections to the unloading system;
wherein the first metering device is configured to adjust the first speed independent of the second speed;
the unloading system configured to receive and unload the dry grain from the grain dryer system via the single unload point.

5. A grain dryer system comprising:
a loading system;
a pair of grain columns;
the loading system configured to load wet grain into the pair of grain columns;
the pair of grain columns having a mixed-flow heating section;
the pair of grain columns having a cooling section;
wherein the pair of grain columns have respective lower sections configured to direct dry grain to a single unload point for unloading;
an unloading system;
the unloading system configured to receive and unload the dry grain from the grain dryer system via the single unload point;
wherein the unloading system includes an auger configured to move grain from the single unload point.

6. The system of claim 1, further comprising a plenum positioned between the pair of grain columns.

7. The system of claim 1, wherein the cooling section of the pair of grain columns is configured to warm air provided to the mixed-flow heating section.

8. The system of claim 1, further comprising an airflow system;
wherein the airflow system is configured to move ambient air through the cooling section of the pair of grain columns, heat the air moved through the cooling section of the pair of grain columns to produce heated air, and move the heated air through the heating section of the pair of grain columns.

9. A grain dryer system, comprising:
a loading system;
a pair of grain columns;
the loading system configured to load wet grain into the pair of grain columns;
the pair of grain columns having a drying section;
the drying section comprising a mixed-flow airflow system;
an unloading system;
the unloading system configured to receive dry grain from the drying section of the pair of grain columns and unload the dry grain from the grain dryer system;
wherein the unloading system is configured to unload the dry grain via a single unload point.

10. The system of claim 9, wherein the mixed-flow airflow system comprises a heating section and a cooling section.

11. The system of claim 9, wherein the mixed-flow airflow system comprises a heating section and a cooling section; and
wherein the airflow system is configured to move ambient air through the cooling section of the pair of grain columns, heat the ambient air moved through the cooling section of the pair of grain columns to produce heated air, and move the heated air through the heating section of the pair of grain columns.

12. The system of claim 9, wherein the drying section further comprises a heater coupled to the mixed-flow airflow system configured to aid in drying the wet grain.

13. The system of claim 9, wherein the mixed-flow airflow system comprises a heating section and a cooling section; and further comprising a heater positioned between the heating section and the cooling section.

14. A grain dryer system, comprising:
a loading system;
a pair of grain columns;
the loading system configured to load wet grain into the pair of grain columns;
the pair of grain columns having a drying section;
the drying section comprising a mixed-flow airflow system;
wherein the drying section further comprises a tempering section within the mixed-flow airflow system;
an unloading system;
the unloading system configured to receive dry grain from the drying section of the pair of grain columns and unload the dry grain from the grain dryer system;
wherein the unloading system is configured to unload the dry grain via a single unload point.

15. The system of claim 9, wherein the mixed-flow airflow system comprises a heating section; and
wherein the heating section has a plurality of inlet ducts and a plurality of exhaust ducts extending through the pair of grain columns.

16. A grain dryer system, comprising:
a loading system;
the loading system operatively connected to a pair of grain columns;
the loading system configured to load wet grain into the pair of grain columns;
the pair of grain columns having a drying section;
wherein the drying section comprises a mixed-flow heating section;
an unloading system;
the unloading system operatively connected to the pair of grain columns;
the unloading system configured to receive dry grain from the drying section of the pair of grain columns;
the unloading system configured to unload the dry grain from the grain dryer system via a single unload point.

17. The system of claim 16, wherein the drying section further comprises a cooling section and an airflow system;
wherein the airflow system is configured to move ambient air through the grain columns in the cooling section, heat the air moved through the grain columns in the cooling section to produce heated air, and move the heated air through the mixed-flow heating section.

18. The system of claim 16, wherein the drying section further comprises a cooling section; and further comprising a tempering section positioned between the heating section and the cooling section.

19. A grain dryer system, comprising:
a loading system;
the loading system operatively connected to a pair of grain columns;
the loading system configured to load wet grain into the pair of grain columns;
the pair of grain columns having a drying section;
wherein the drying section comprises a mixed-flow heating section;
wherein the drying section further comprises a cooling section and a tempering section;
the tempering section positioned between the mixed-flow heating section and the cooling section; and
wherein the tempering section is configured to prevent air flow through the grain columns at the tempering section;
an unloading system;
the unloading system operatively connected to the pair of grain columns;
the unloading system configured to receive dry grain from the drying section of the pair of grain columns;
the unloading system configured to unload the dry grain from the grain dryer system via a single unload point.

20. The system of claim 16, wherein the mixed-flow heating section has a plurality of inlet ducts and a plurality of exhaust ducts extending through the pair of grain columns.

21. A grain dryer system, comprising:
a loading system;
a pair of grain columns;
the loading system configured to load wet grain into the pair of grain columns;
the pair of grain columns having a mixed-flow heating section;
the pair of grain columns having a cooling section;
the pair of grain columns having a meter device configured to control a speed at which grain flows;
wherein the pair of grain columns have respective lower sections configured to direct dry grain to a single unload point for unloading;
an unloading system;
the unloading system configured to receive and unload the dry grain from the grain dryer system via the single unload point.

* * * * *